(12) United States Patent
Matsumoto et al.

(10) Patent No.: US 8,479,600 B2
(45) Date of Patent: Jul. 9, 2013

(54) BI-DIRECTIONAL ROTARY ACTUATOR

(75) Inventors: Atsushi Matsumoto, Fukushima (JP);
Toshiyuki Ishikawa, Fukushima (JP);
Hiroyuki Kanno, Fukushima (JP)

(73) Assignees: Oki Electric Industry Co., Ltd., Tokyo
(JP); **Oki Micro Engineering Company
Limited**, Fukushima (JP)

( * ) Notice: Subject to any disclaimer, the term of this
patent is extended or adjusted under 35
U.S.C. 154(b) by 235 days.

(21) Appl. No.: 12/998,028

(22) PCT Filed: Jun. 26, 2009

(86) PCT No.: PCT/JP2009/002933
§ 371 (c)(1),
(2), (4) Date: Mar. 10, 2011

(87) PCT Pub. No.: WO2010/131299
PCT Pub. Date: Nov. 18, 2010

(65) Prior Publication Data
US 2011/0154922 A1    Jun. 30, 2011

(30) Foreign Application Priority Data
May 13, 2009    (JP) .................................. 2009-117079

(51) Int. Cl.
*F16H 21/16*    (2006.01)
(52) U.S. Cl.
USPC ........................................ 74/25; 74/54; 74/89
(58) Field of Classification Search
USPC .................................................. 74/25, 54, 89
See application file for complete search history.

(56) References Cited

U.S. PATENT DOCUMENTS

| 4,575,027 A * | 3/1986 | Cronin ........................ 244/99.12 |
| 4,834,319 A * | 5/1989 | Ewy et al. ..................... 244/99.9 |
| 4,858,290 A * | 8/1989 | Hirose et al. ................... 29/35.5 |
| 4,920,816 A * | 5/1990 | Inabe et al. ................... 74/89.38 |
| 7,544,911 B2 * | 6/2009 | Socha-Leialoha ............ 200/559 |

FOREIGN PATENT DOCUMENTS

| JP | 49-011777 | 1/1974 |
| JP | 55-56483 | 4/1980 |
| JP | 61-184868 | 11/1986 |
| JP | 2006-127131 A | 5/2006 |
| JP | 2006-213528 A | 8/2006 |

* cited by examiner

*Primary Examiner* — David M Fenstermacher
(74) *Attorney, Agent, or Firm* — Rabin & Berdo, P.C.

(57) ABSTRACT

A bi-directional rotary actuator causing the output shaft thereof to output two or more kinds of bi-directional and rotational driving forces. A bi-directional rotary actuator includes a rotary solenoid (101) serving as a driving source, a link body (104) engaged with a shaft (132) such that a rotational force can be transmitted to the shaft, an output element (105) connected to the link body, and switching operation means (106) for selecting connection between the link body and the output element. Transmission of a rotational force between the link body and the output element can be appropriately switched to either gear drive performed by meshing of gears or link drive based on a link ratio, and this allows the actuator to output bi-directional rotary driving forces having two or three rotational angles. The switching described above is performed by movement, in the direction of the axis of the shaft, of the link body by utilizing the repulsive or attractive action of an electromagnetic force. The movement of the link body is performed by direct application of the electromagnetic force, or alternatively, by utilizing the principle of leverage through an arm.

20 Claims, 17 Drawing Sheets

FIG.6A
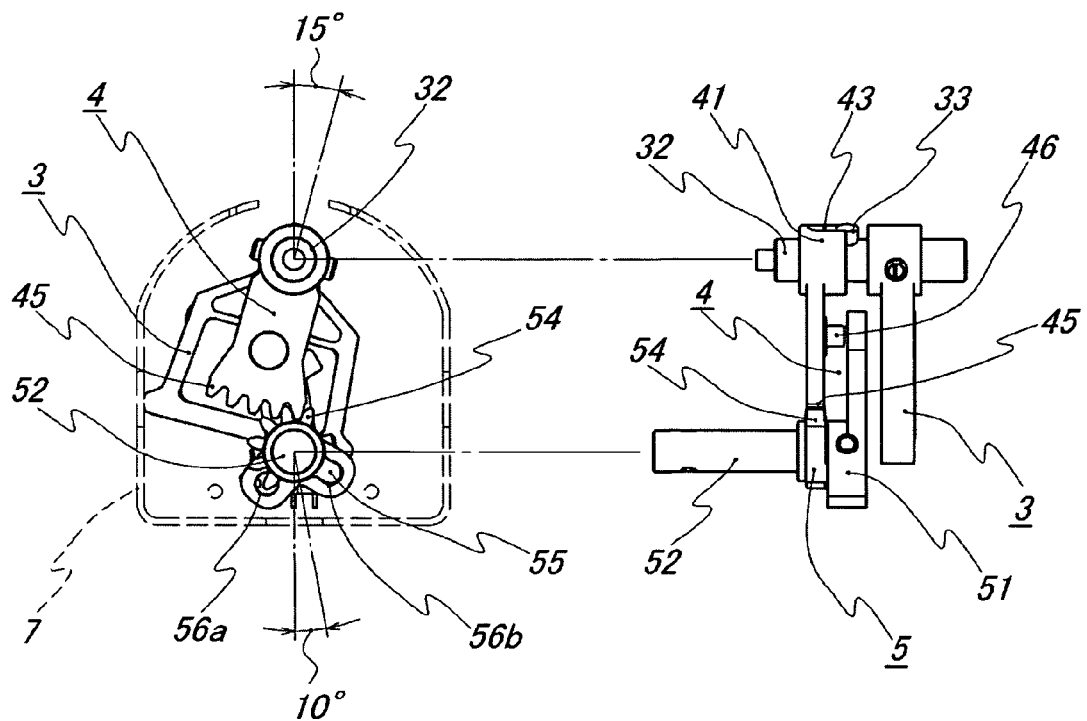
FIG.6B
FIG.6C
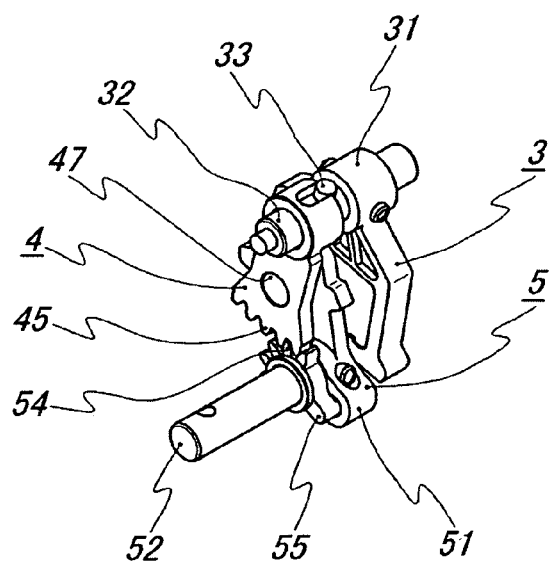

BI-DIRECTIONAL ROTARY ACTUATOR

TECHNICAL FIELD

The invention of the present application (hereinafter, referred to as "the present invention") relates to a bi-directional rotary actuator that can output an axial rotational force having two or more rotational angle displacements from a single output shaft.

RELATED ART

A common rotary actuator performs a bi-directional rotation in a predetermined angle range. For example, the rotary actuator is used as a driving source of a guide piece (blade) that switches a moving path of sheets of paper or bank notes, that are made to move in a flowing manner. The moving path includes various paths depending on devices. The moving path includes a path type where the moving path is switched if necessary to allow a flow in two or three directions.

For example, a technology of the switching into three directions is disclosed in paragraph numbers [0033], [0100] to [0103] of a specification of Japanese Patent Application Laid-Open (JP-A) No. 2006-127131 entitled "Circulation Type Banknote Dispenser" or the like. In the disclosure, a guide member, which serves as branching means including the three-directions-switching mechanism, is rotated by using a motor for the diverging using a stepping motor. In this configuration, an input pulse of the stepping motor is controlled, and the guide means is rotated at a rotational speed of an output shaft, and thereby the guide means is maintained to stop temporarily. However, the configuration using the stepping motor has an advantage that plural kinds of rotational angles can be set by one output shaft, but there is a problem that the stepping motor loses steps when the switching is performed at a high speed for the purpose of high-speed processing. In addition, it is necessary to perform exciting at all times for maintaining the blade in a switched state, and thereby a problem regarding power saving is also present.

In addition, as another known technology, JP-A No. 2006-213528 entitled "Paper Sheet Carrying Direction Changing Device" is disclosed. As will be apparent from FIG. 1 in the abstract, the technology is related to a mechanism, in which a switching of carrying path of the paper sheet into three directions is performed in a manner in which a rotation of one gate means is performed by one driving means and a rotation control of the gate means is performed by another driving means. As the driving means, a direct acting solenoid is used.

However, the three-directions-switching mechanism using the two direct acting solenoids, as described above, is performed by two direct acting solenoids disposed independently, such that there is a problem that number of parts is increased. In addition, the adjustment for cooperating the two direct acting solenoid becomes complex, and thereby there is a problem regarding the reliability and durability of the mechanism.

PRIOR ART DOCUMENT

Patent Document

Patent Document 1: Japanese Patent Application Laid-Open (JP-A) No. 2006-127131
Patent Document 2: JP-A No. 2006-213528

DISCLOSURE OF THE INVENTION

Problem to be Solved by the Invention

Here, an object of the present invention is to solve the above-described problem, and to provide a bi-directional rotary actuator capable of outputting two or more rotational angle displacements by one output shaft.

Method of Solving the Problem

To accomplish the above-described object, the bi-directional rotary actuator of the present invention has a configuration described below.

Namely, it is characterized by including a rotary solenoid, supported by a base, that supplies a bi-directional rotational force; a link body that engages with a shaft of the rotary solenoid to be allowed to move in an axial direction and to transmit a rotational force; an output element that selects one engagement means from two or more different kinds of link ratios or rotational force transmission ratios to receive a rotational force from an outer ring shaft of the link body; and switching operation means that performs the selection of engagement means by a movement in an axial direction of the link body by moving the link body engaged with the shaft.

Further, it includes a configuration that the engagement including two or more kinds of different link ratios or rotational force transmission ratios, is selected from two or more kinds of engagement means including an engagement point of a different rotational radius of the link body from a rotational shaft to transmit a rotational force to the output element.

Furthermore, it is characterized by that the engagement between the link body and the output element is, for example, engagement means selected from an inserting engagement or a rotational force transmitting engagement.

Effect of the Invention

According to the present invention, due to the above-described configuration, it is possible realize so-called multi-mode output, in which a bi-directional rotational force of two or more kinds of rotational angle displacements is output from a single output shaft. As a result, a configuration with a smaller exclusive volume becomes possible, such that the degree of freedom in regard to an attachment place increases, and an application can be made in wide range of apparatuses such as various apparatuses (for example, an ATM, a printer, automatic vending machine or the like) and that require the switching of a flow path of bank notes or sheets of paper among plural passages. In addition, since a solenoid is used as an operation source, it is possible to obtain sure operation and reliability.

BRIEF DESCRIPTION OF DRAWINGS

FIG. 6A to FIG. 6C shows a front view, a side view and a perspective view illustrating a switching operation state of the embodiment 1.

BEST MODE OF IMPLEMENTING THE INVENTION

Figure 1:
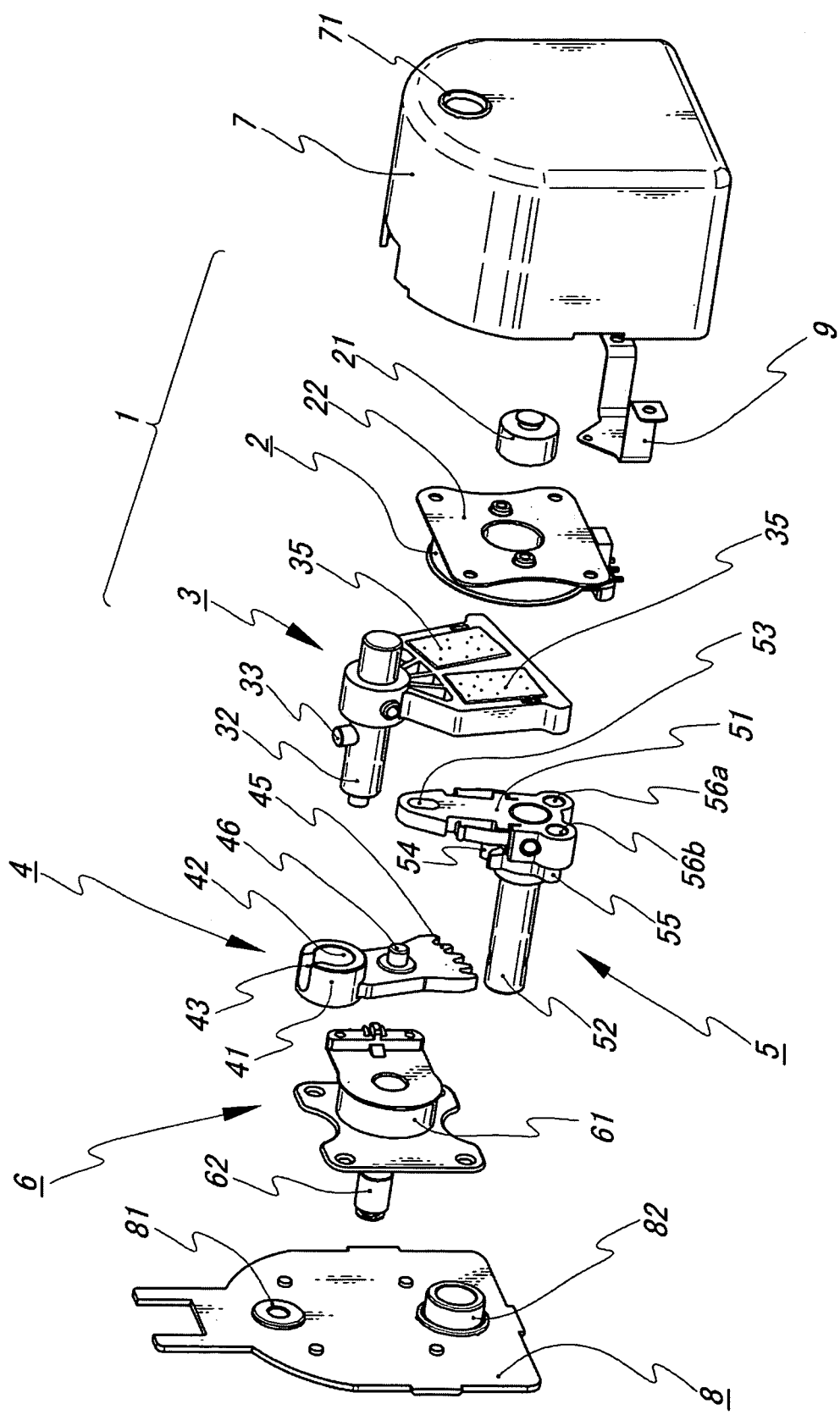
FIG. 1 is an exploded perspective view seen from a rear side, in which each component of an embodiment 1 is exploded.
Figure 2:
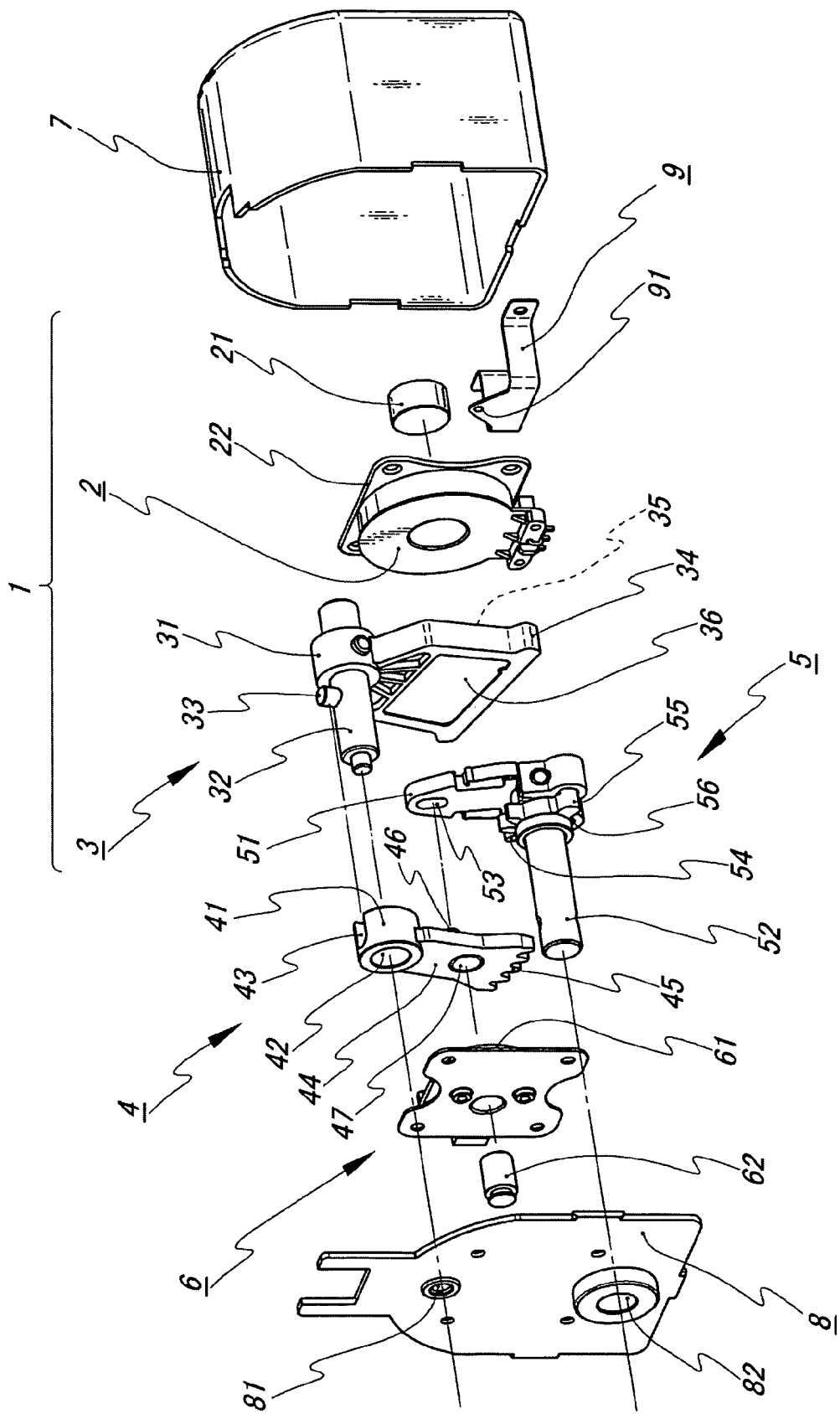
FIG. 2 is an exploded perspective view seen from a front side, in which each component of the embodiment 1 is exploded.
Figure 3:
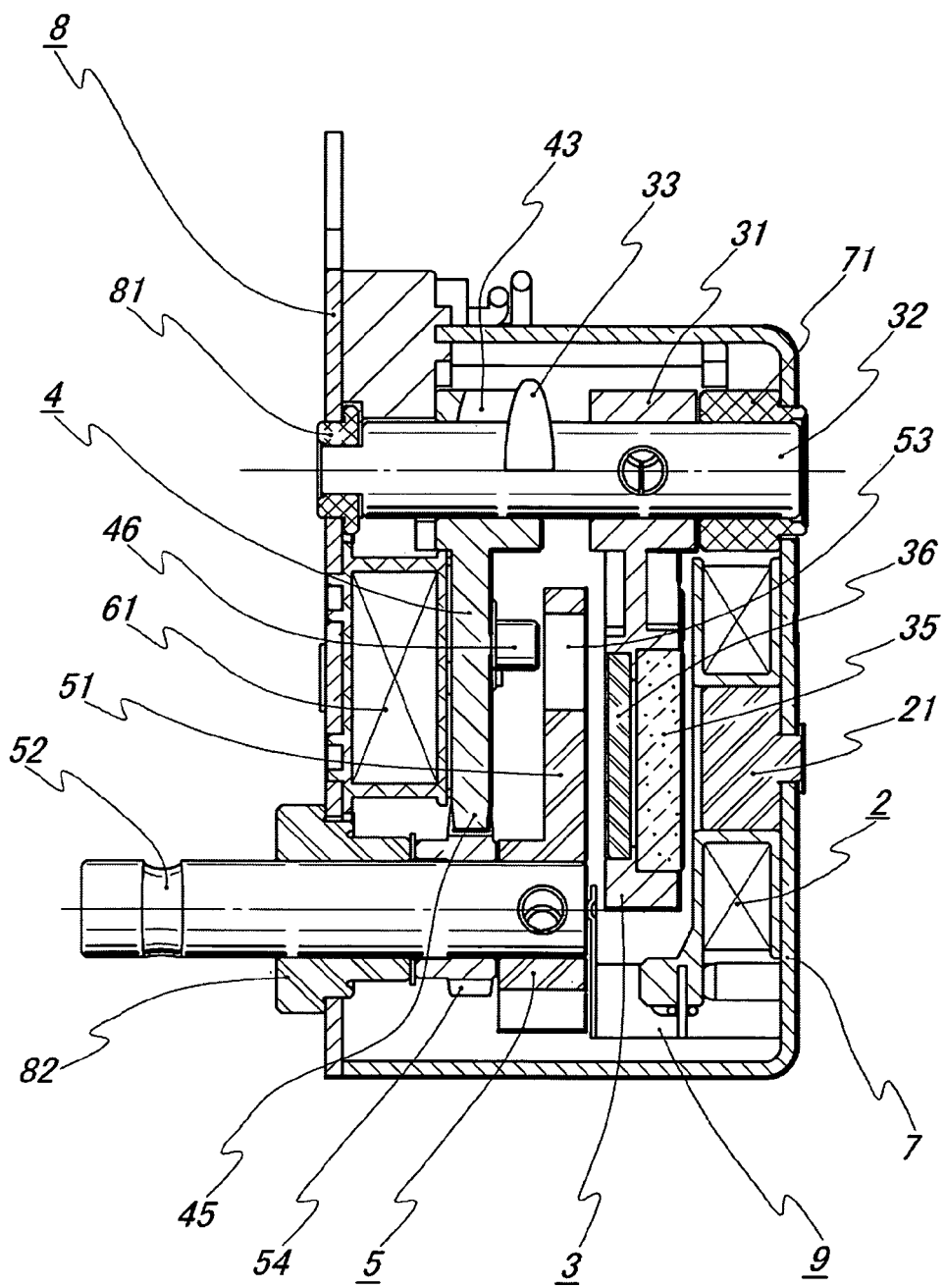
FIG. 3 is a longitudinal cross-sectional view of the embodiment 1.

Hereinafter, embodiments of the present invention will be described in detail with reference to accompanying drawings.

Embodiment 1

FIGS. 1 to 8D illustrate the embodiment 1 of the present invention.

First, examples of a main component include a rotary solenoid as a driving source, a link body that transmits a driving force of the driving source, an output element that engages with the link body and outputs bi-directional rotational forces having two or more kinds of angle displacements, and switching operation means that performs a switching operation of the link body.

Hereinafter, basic configurations will be separately described.

Embodiment 1 is accommodated in a casing including a tube-shaped rear cover 7 having a bottom and a front plate 8 closing an opening of the rear cover.

[Configuration of Rotary Solenoid]

Reference numeral 1 indicates a rotary solenoid including an electromagnetic coil 2 as a driving source and a rotor 3 that is driven by the electromagnetic coil and fluctuates (moves in a bi-directional rotational manner). The electromagnetic coil 2 of which a core 21 is disposed at a center portion thereof is fixed to an inner bottom surface of the rear cover 7, which becomes a base, via a base plate 22. The rotor 3 includes a shaft 32 that is held by a hub 31 of which a rotational shaft is displaced at an external side of the electromagnetic coil 2, and an amateur plate 34 that is connected to the hub 31 in a positional relation so as to face a magnetic pole face of the electromagnetic coil 2.

The shaft 32 is stretched and rotatably supported between a rear bearing 71 formed in a bottom surface of the rear cover 7 and a bearing 81 of the front plate 8, which is disposed to be open at a position corresponding to the bearing 71.

The amateur plate 34 includes two magnets 35 and 35 disposed in a surface thereof facing the electromagnetic coil 2 such that each heteropolar face of the two magnets faces the electromagnetic coil 2. In addition, in this embodiment, the above-described two magnets are disposed in parallel, but are not limited thereto and one surface side of one magnet may be magnetized in opposite polarity in the rotational direction. In addition, in a rear surface side (front side) of the magnets 35, a back yoke 36 is disposed to block off the leakage of magnetic field lines toward the front side.

Due to the above-described configuration, an attraction and a repulsion between the magnetic coil 2 and the magnets 35 are repeatedly performed through a magnetic pole switching of the magnetic coil 2, such that the rotor 3 of the rotary solenoid 1 reciprocates with the hub 31 being an axis, and outputs, from the shaft 32, a bi-directional rotational force. In addition, the fluctuation range of the rotor 3 may be regulated to come into contact with an inner surface wall of the rear cover 7, or an additional stopper member (not shown) may be disposed.

[Configuration of Link Body]

The link body 4 is connected to the shaft 32.

The link body 4 includes an outer ring shaft 41 and a gear plate 44 formed to extend from the outer ring shaft 41 in a direction orthogonal to a rotational axis of the shaft 32 (in a plane direction facing the rotor 3). The outer ring shaft 41 makes up a rotational axis of the link body 4 and has an annular mounting opening 42, which is formed to be penetrated, into which the shaft 32 is fitted to be engaged with the annular mounting opening 42, thereby obtaining a rotational force. The configuration for receiving the rotational force is realized by opening a side surface of the outer ring shaft 41 from the annular mounting opening 42, by forming a substantially U-shaped cut-out engagement groove 43 from a substantially middle point of a side surface of the outer ring shaft 41 toward the rotor 3, and by movably fitting a convex-shaped engagement pin 33 formed on side circumferential surface of the shaft 32 into the engagement groove 43. The engagement groove 43 is formed in a substantially U-shape for regulating a movement of the link body 4 in a circumferential direction (rotational direction) while permitting a movement of the link body 4 in an axial direction with the link 4 being annularly mounted on the shaft 32. Therefore, the axial rotational force of the shaft 32 is transmitted to the link body 4 regardless of the movement position. In addition, the length of the formed U-shape of the engagement groove 43 is most suitably set in consideration of a meshing width of an active gear 45 and a passive gear 54 to be described later. The shape of the substantially U-shaped engagement groove 43 is not limited thereto, but may be a mechanism that only transmits a rotational force without regulating the movement in an axial direction. For example, the displacement of the engagement groove 43 and the engagement pin 33 may be made in an opposite manner, such that the engagement groove may be formed in the shaft 32 and the engagement pin 33 may be disposed in the link body 4.

The gear plate 44 of the link body 4 is formed in a fan shape and the active gear 45 is formed along a rotational circumference, with the outer ring shaft 41 being a rotational axis. The active gear 45 is formed in a curbed rack shape having plural teeth. The gear plate 44 has a convex insert shaft 46 in a rotor-side surface thereof, which becomes a connection point (pin connection) when the gear plate 44 and a cam 51 described below are link-connected. A position where the insert shaft 46 is formed is set such that a distance from a rotational center of the insert shaft 46 to a rotational center of the shaft 32 of the rotor 3 and a distance from a rotational center of the insert shaft 46 to a rotational center of an output shaft 52 of an output element 5, become a link ratio. In this embodiment 1, the link ratio is set to 2:3. In addition, the gear plate 44 has a magnet 47 embedded in a front side surface thereof

[Configuration of Output Element]

The output element 5 is connected to the link body 4.

The output element 5 includes, as a main part, an output shaft 52 that is disposed in a positional relation parallel with the shaft 32 of the rotary solenoid 1 and outputs a rotational force to the outside. A cam 51 is formed in an end of the output shaft 52, which faces the rotor 3, to extend in a direction orthogonal to an axis thereof (a radial direction from an axis). In addition, the cam 51 has, at a distal end thereof, a long-hole-shaped bearing hole 53 engaged with the insert shaft 46 of the gear plate 44 with play. In addition, the passive gear 54 is movably and annularly mounted on the output shaft 52 with a spaced distance equal to or larger than the length of the insert shaft 46 from the cam 51 to the front side.

Further, the passive gear 54 has a stopper pin 55 protruded in the rotor direction at a peripheral side portion where gear teeth are not formed. In addition, two fitting holes 56 with a shape allowing the stopper pin 55 to fit thereto, are formed at an attachment portion (base portion) to the output shaft 52. The passive gear 54 can be integral with the output shaft 52 by a selective insertion into the fitting holes 56a and 56b. Therefore, by the selection of the fitting holes 56 into which the stopper pin 55 is fitted, the rotational direction of the cam 51 may be set as CW (clockwise) or CCW (counter clockwise). The output shaft 52 is rotatably supported by an output bearing 82 of which the distal end is provided at the front plate 8 and functions as an external output.

[Configuration of Switching Operation Means]

A switching operation means 6 linearly moves the link body 4.

The switching operation means 6 is disposed between the front plate 8 and the gear plate 44 of the link body 4. In this configuration, an electromagnetic coil 61, in which a core 62 is disposed at a center portion thereof, is attached to the rear side of the front plate 8, and is disposed to face the magnetic pole of the magnet 47 disposed at the gear plate 44. Therefore, a linear movement along the shaft 32 is realized by using a repulsive force or an attractive force acting on the magnet 47 depending on the switching of the magnetic pole at the electromagnetic coil 61.

[Others]

In addition, in the figures, the power distribution to the electromagnetic coils 2 and 61 is performed via a lead line from an external control device; however, the configuration of the circuit is not shown in the figures, since it is general.

In addition, reference numeral 9 represents a stopper, the stopper 9 is caulked and fixed to the rear cover 7, a protrusion 91 formed at the distal end of the stopper 9 comes into contact with a rear-side end surface of the output shaft 52 and receives a thrust power transmitted from the output shaft 52.

[Explanation of Operation of Embodiment 1]

Next, the operation of the embodiment 1 configured as described above will be described with reference to drawings.

Figure 4A:
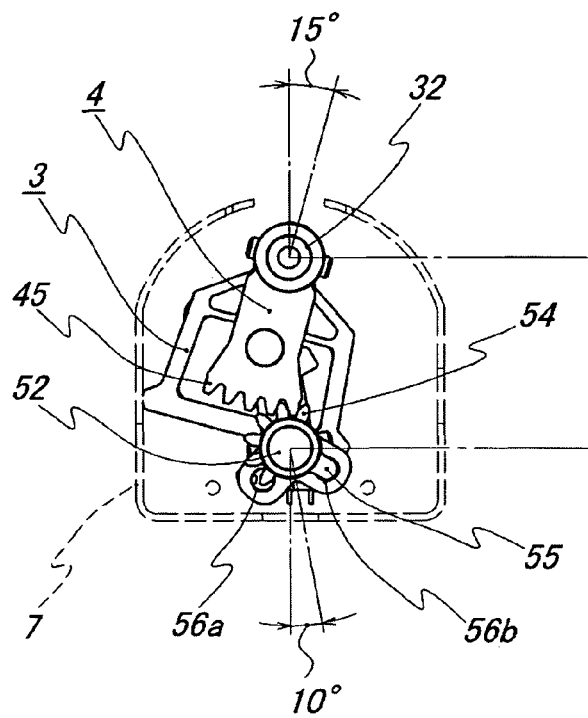
FIG. 4A to FIG. 4C shows a front view, a side view including a partial cut-out section, and a perspective view illustrating a sequential operation state of the embodiment 1.
Figure 4B:
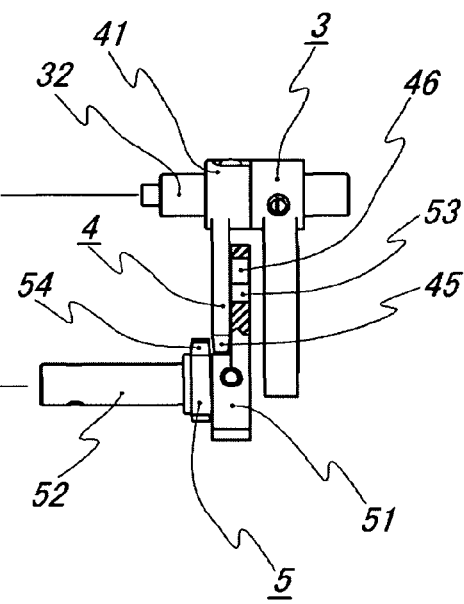
Figure 4C:
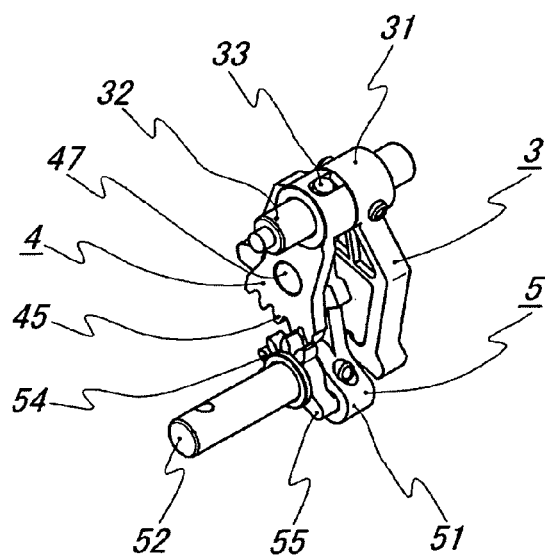

FIGS. 4A to 4C shows an explanation view illustrating the operation of the embodiment 1, and FIGS. 4A to 7C show a plan view and a perspective view illustrating an operational state of main components.

The characteristic of the embodiment 1 is that a single output shaft outputs a bi-directional rotational force having a specification (mode) where the displacements of two or more kinds of rotational angles are output. Hereinafter, examples of the two kinds of mode will be described. A first mode is defined as a bi-directional rotational driving where a displacement angle (for example, 20°) from a specified reference position is set (hereinafter, abbreviated as "sequential driving") and a second mode is defined as a bi-directional rotational driving where the displacement angle is switched from the first mode and a different displacement angle (for example, 120°) from the reference position is set (hereinafter, abbreviated as "switching driving").

In addition, in the embodiment 1, a driving force that is supplied from the rotary solenoid 1 as a driving source is a bi-directional rotational force having a rotational angle of 30° supplied from the shaft 32.

First, the sequential driving of the first mode will be described with reference to FIGS. 4A to 5C. FIGS. 4A to 5C show a front view, a side view and a perspective view illustrating a positional relation of main components at the time of the sequential driving.

Figure 5A:
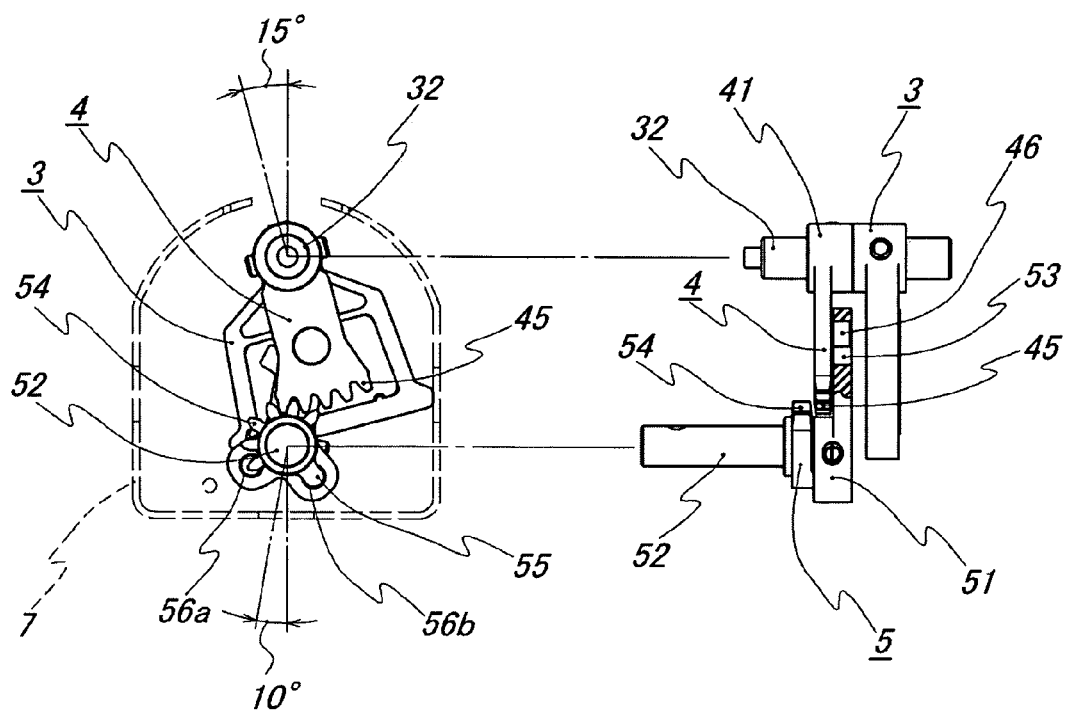
FIG. 5A to FIG. 5C shows a front view, a side view including a partial cut-out section, and a perspective view illustrating a sequential operation state of the embodiment 1.
Figure 5B:
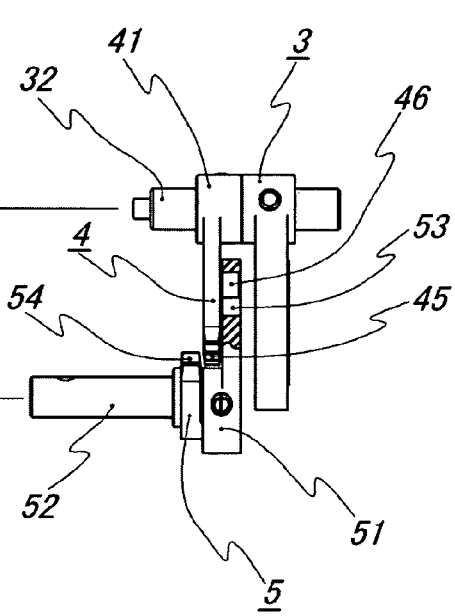
Figure 5C:
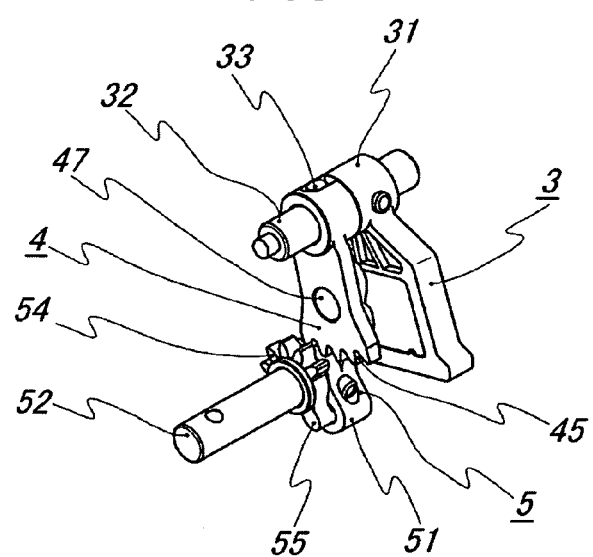
Figure 7A:
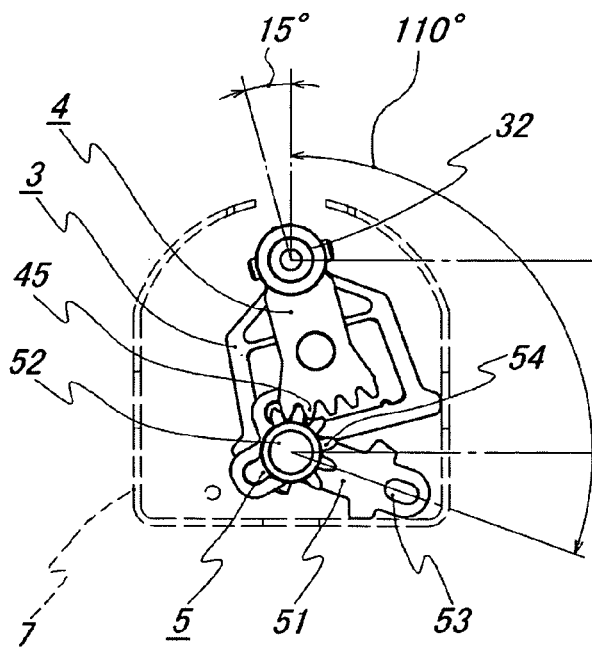
FIG. 7A to FIG. 7C shows a front view, a side view and a perspective view illustrating a switching operation state of the embodiment 1.
Figure 7B:
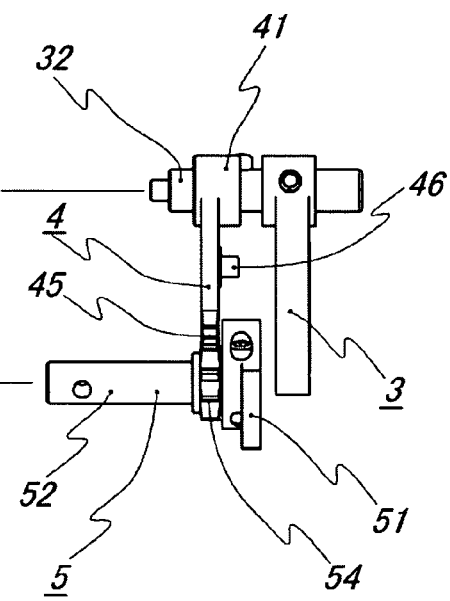
Figure 7C:
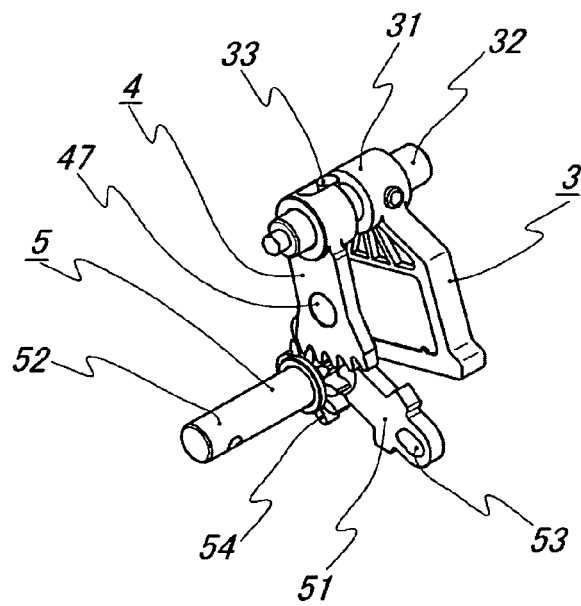
Figure 8A:
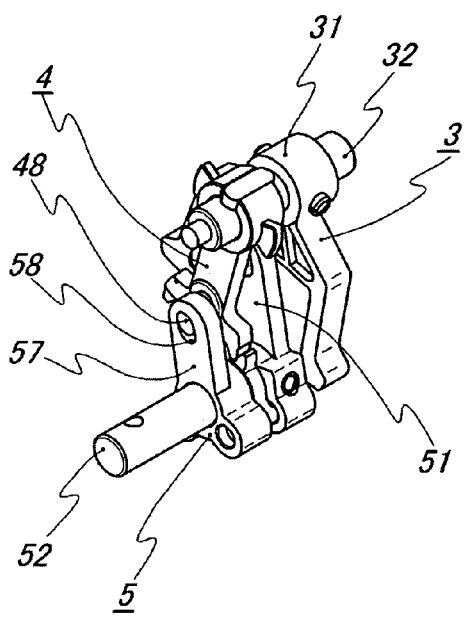
FIG. 8A to FIG. 8D shows side views including a partial cut-out section and a perspective view illustrating another embodiment according to the embodiment.
Figure 8B:
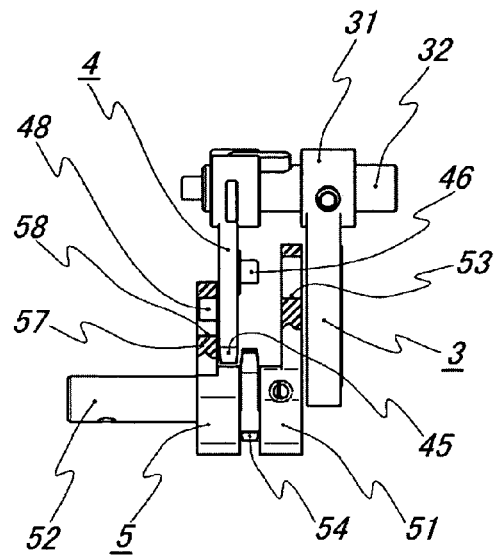
Figure 8C:
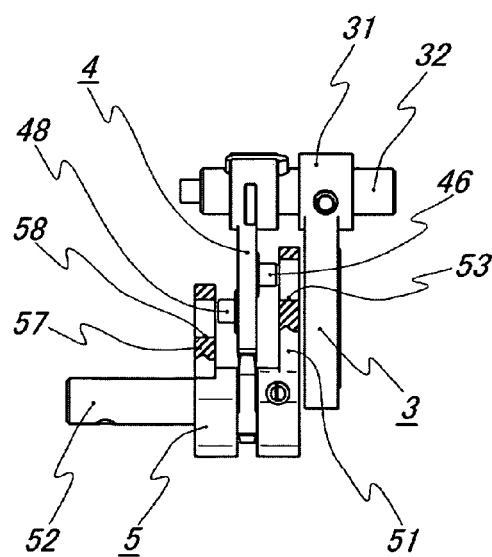
Figure 8D:
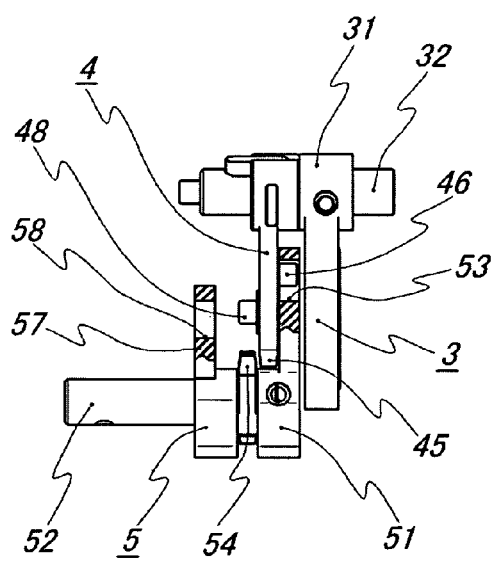
Figure 9:
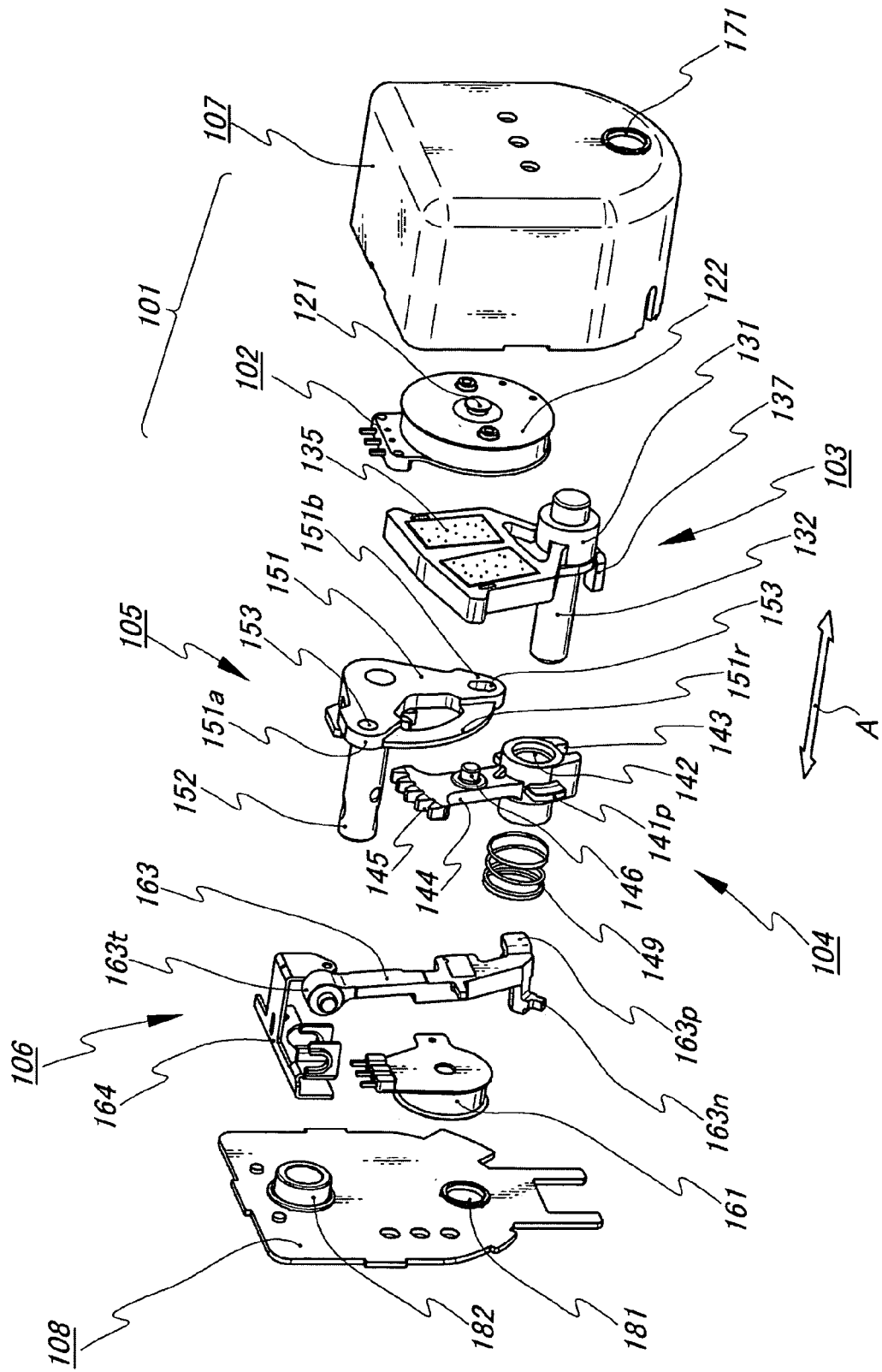
FIG. 9 is an exploded perspective view seen from a rear side (rear cover side), in which each component of an embodiment 2 is exploded.
Figure 10:
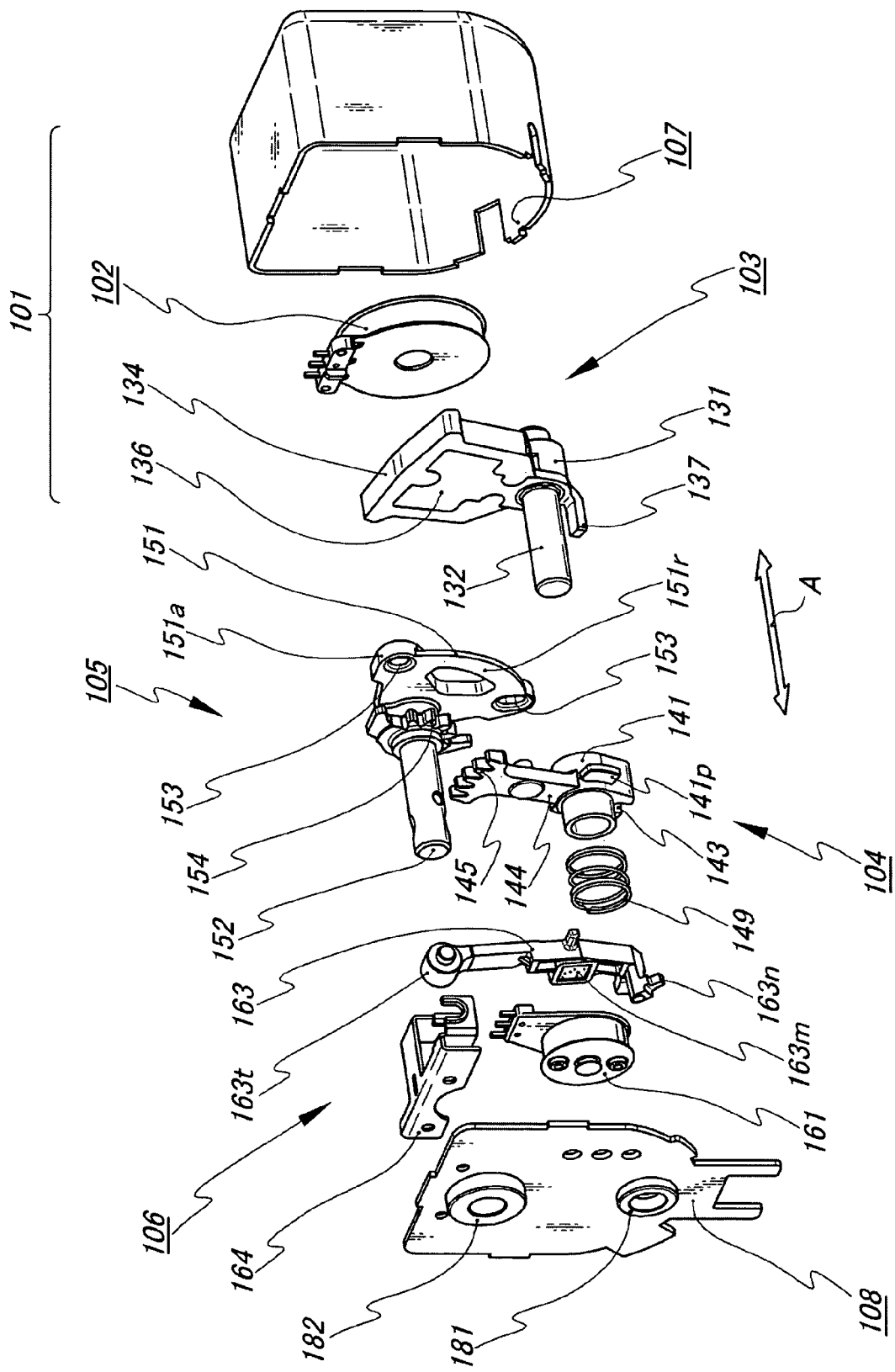
FIG. 10 is an exploded perspective view seen from a front side (output side), in which each component of the embodiment 2 is exploded.
Figure 11:
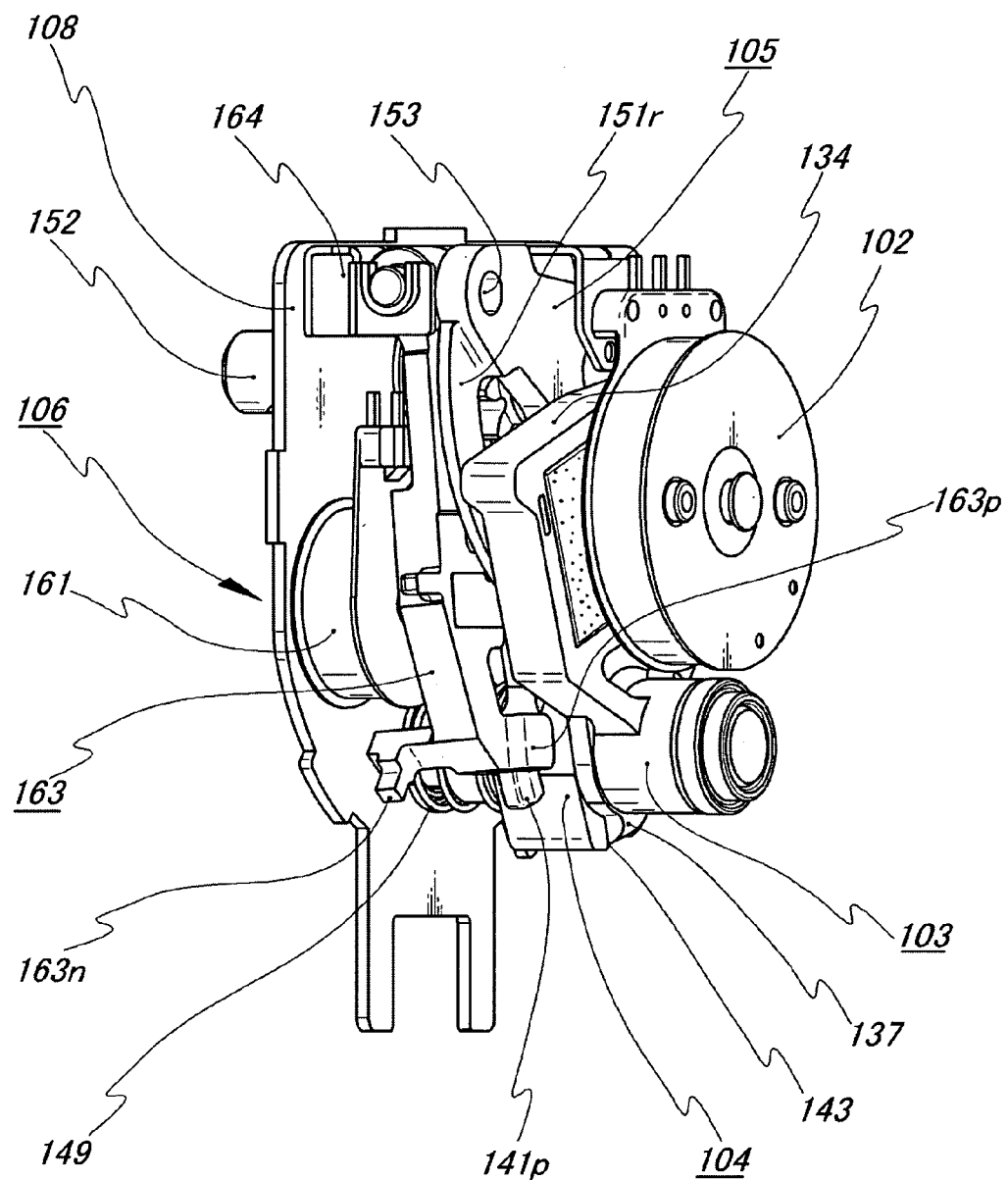
FIG. 11 is a perspective view seen from a rear side, which illustrates an assembled state of each component of the embodiment 2.
Figure 12:
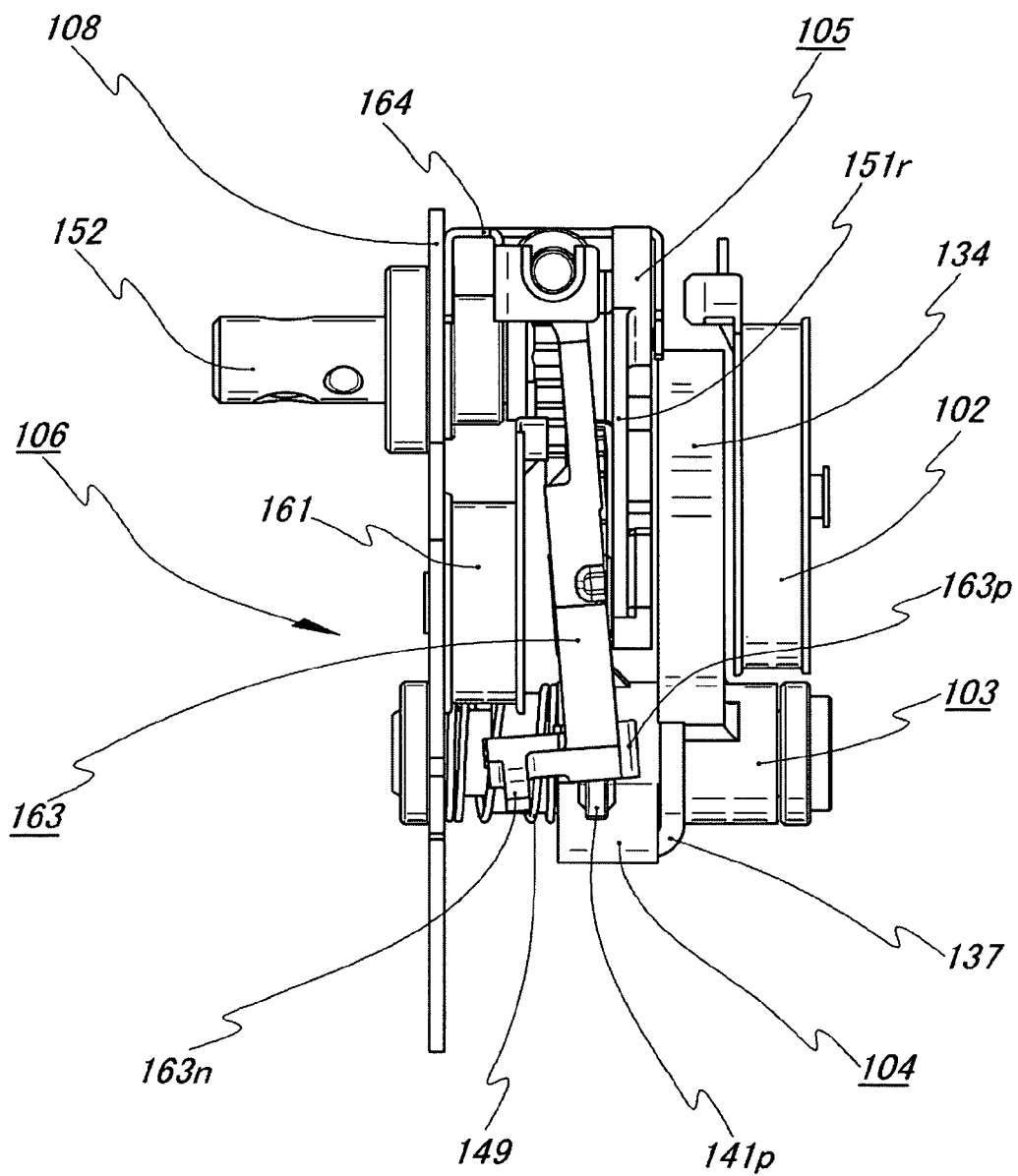
FIG. 12 is a side view illustrating an assembled state of each component of the embodiment 2.
Figure 13:
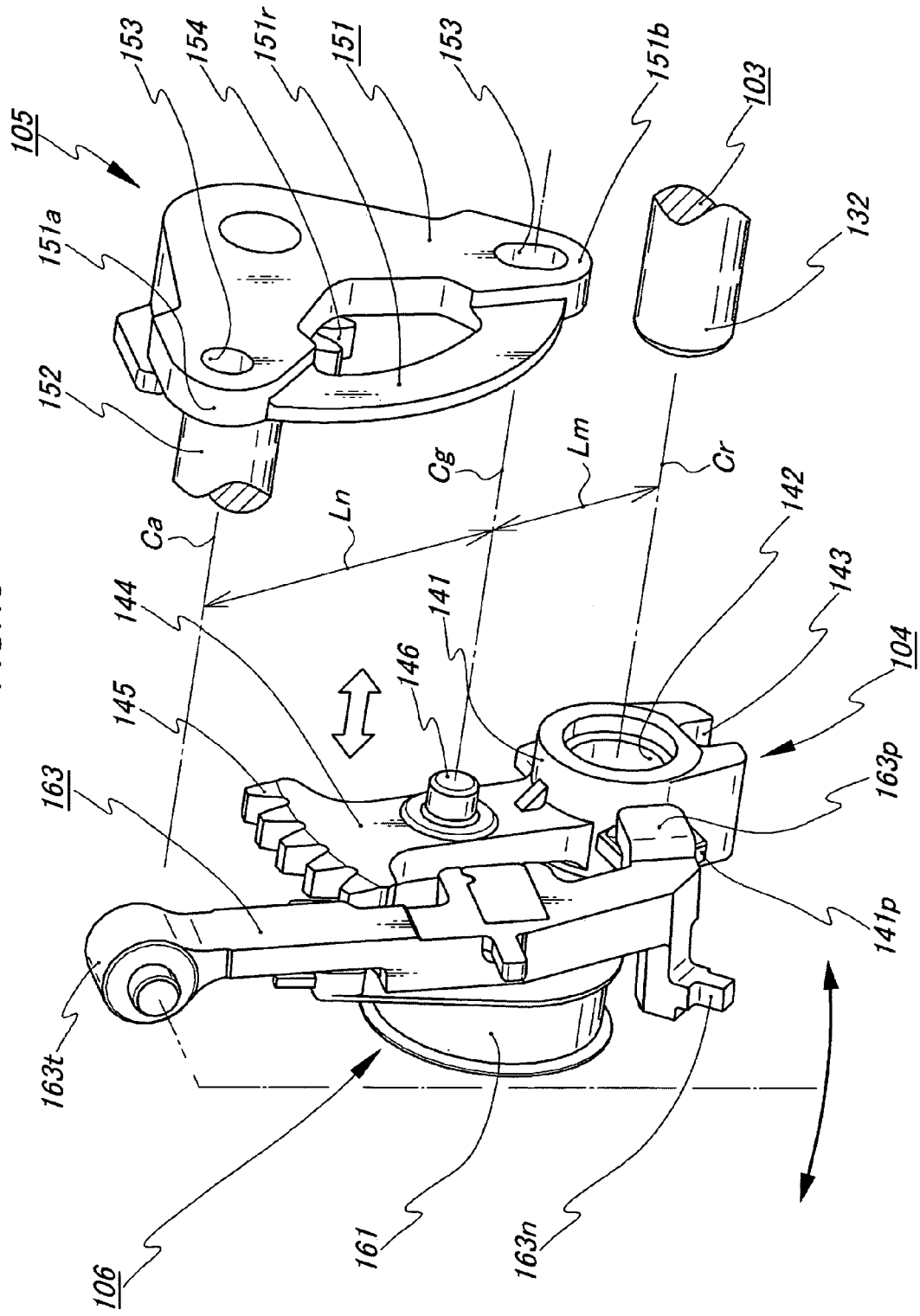
FIG. 13 is a perspective view illustrating a connection between a switching operation means, a link body and an output element according to the embodiment 2.
Figure 14A:
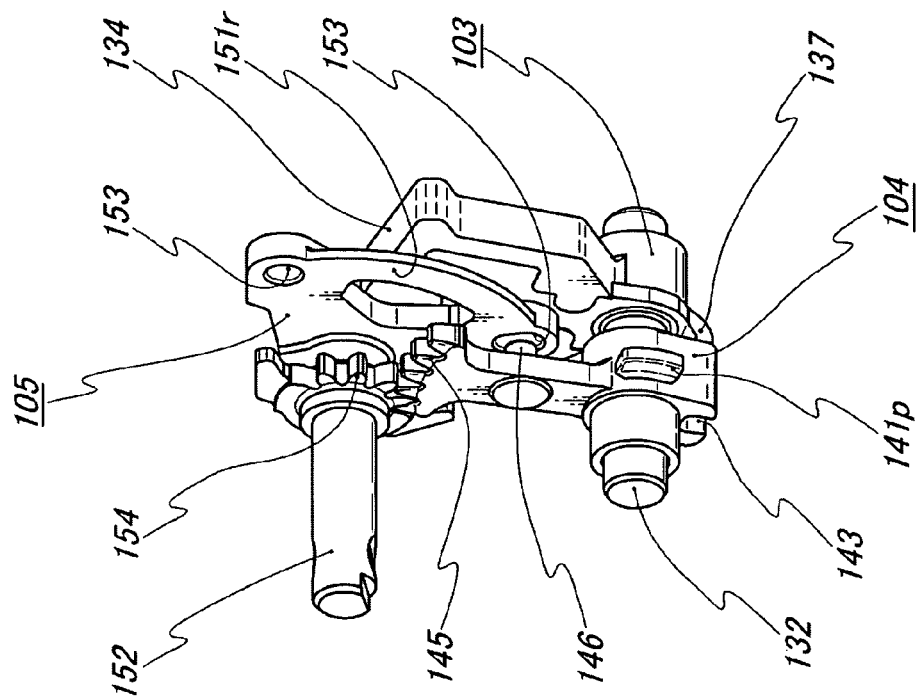
FIG. 14A shows a side view.
Figure 14B:
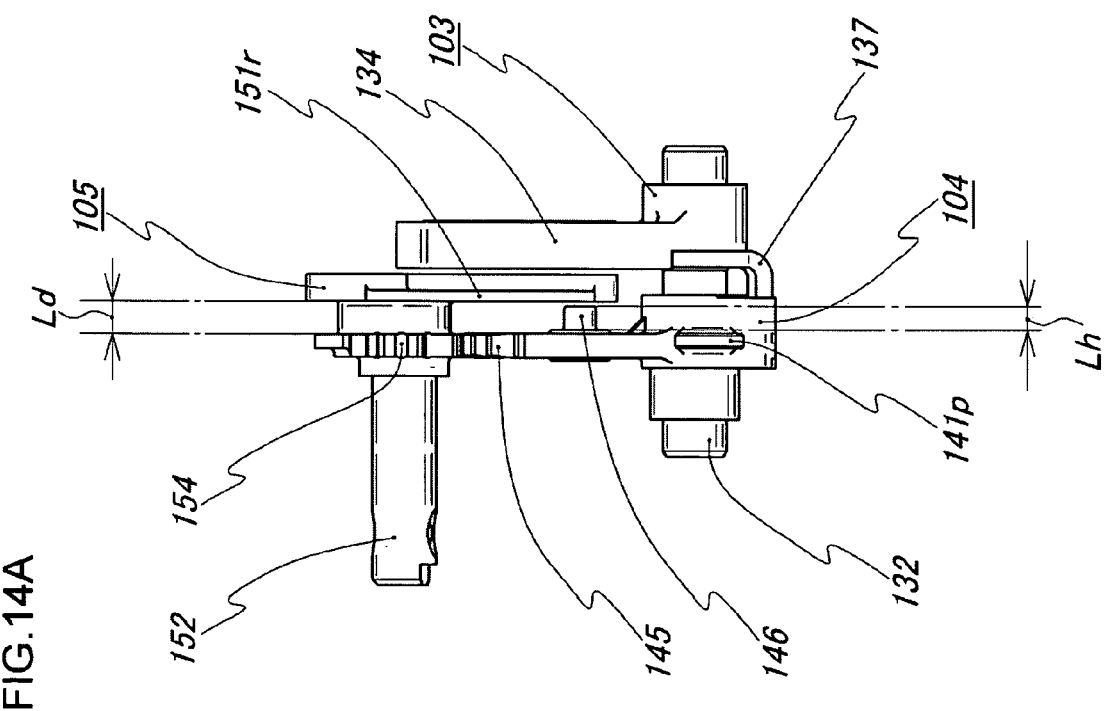
FIG. 14B shows a perspective view, that illustrate a connection between the link body, the output element and the rotor according to the embodiment 2.
Figure 15A:
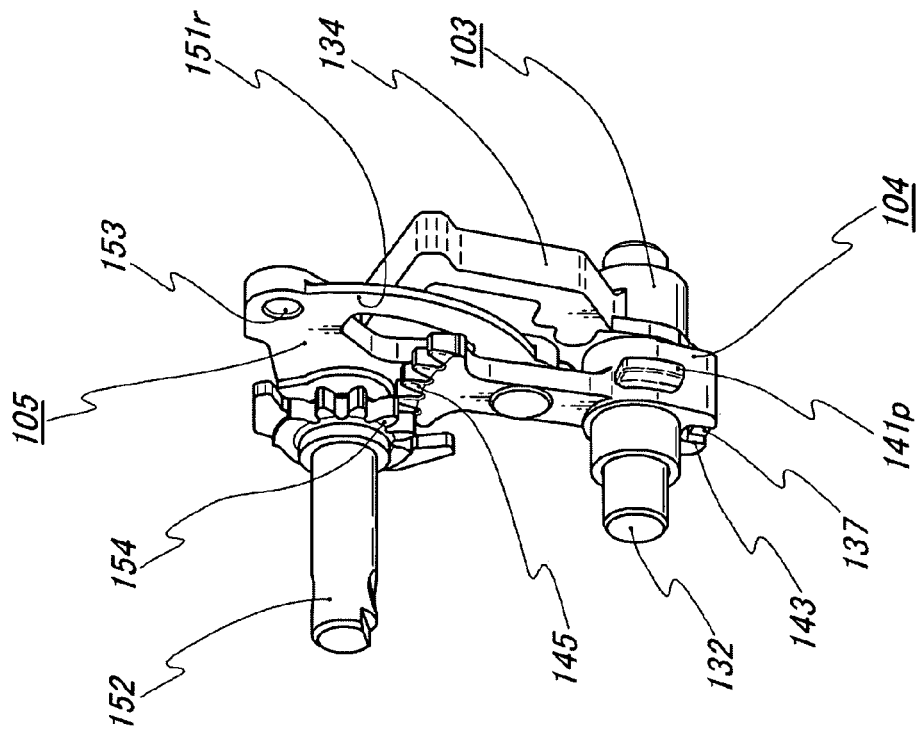
FIG. 15A shows a side view.
Figure 15B:
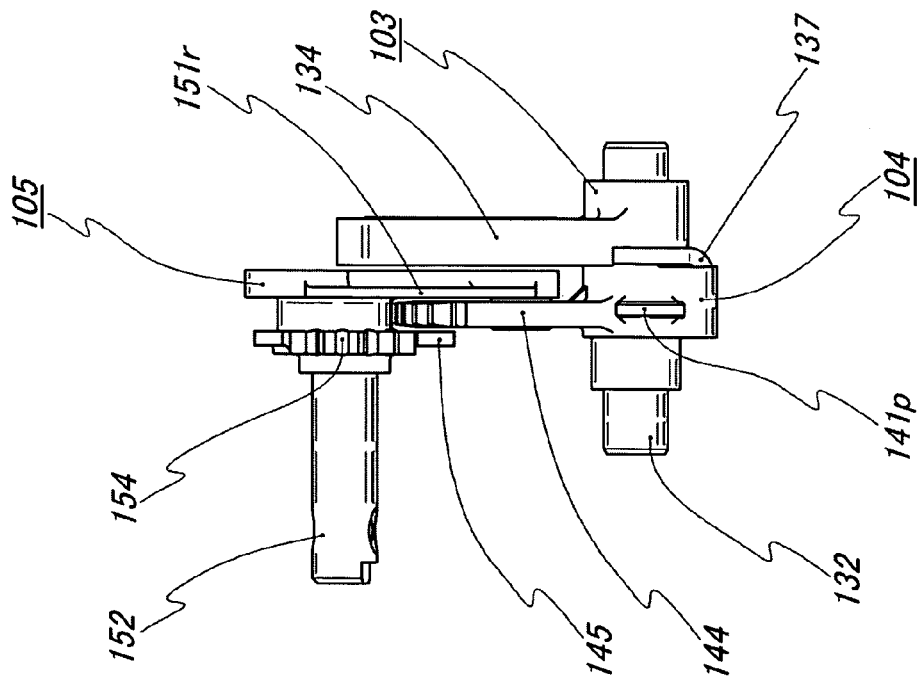
FIG. 15B shows a perspective view, that illustrate a connection between the link body, the output element and the rotor according to the embodiment 2.

The sequential driving of the embodiment 1 is a driving performed in a state where the link body 4 is made to move toward the rotor side by a repulsive magnetic force of the switching operation means 6 and the meshing between the active gear 45 and the passive gear 54 is released (see FIGS. 4B and 5B). At this time, the insert shaft 46 of the gear plate 44 is inserted into the bearing hole 53 of the cam 51 and the link body 4 and the output element 5 are link-engaged with each other via the cam 51 (see FIGS. 4B and 5B). At this positional state, when the rotary solenoid 1 is driven, the shaft 32 axis-rotates within an angle range of 30° (see FIGS. 4A and 5A). Then, the displacement of the rotational angle is transmitted to the output shaft 52 according to a link ratio (2:3) determined by a positional relation of the engagement with the insert shaft 46. As a result, the displacement of the rotational angle, which is transmitted to the output shaft 52, becomes 20° and is output as an axial rotational force bi-directional within the range. In addition, in the embodiment 1, the fitting shaft 46 is formed to be integral with the gear plate 44, but it is not limited thereto, the forming position of the insert shaft 46 with respect to the gear plate 44 may be varied. For example, a selective attachment at plural positions or a sliding fixing in a groove may be possible. In this case, the bearing hole 53, which is engaged with the insert shaft 46, is formed in a long-hole shape, such that it can sufficiently correspond to this case. Due to this, the link ratio is suitably selected.

In addition, even when the power distribution to the electromagnetic coil 61 making up the switching operation means 6 is blocked off, the link body 4 is maintained with the magnet 47 being attracted to the rotor side.

Next, the switching driving of the second mode will be described with reference to FIGS. 6A to 7C. FIGS. 6A to 7C show a front view, a side view and a perspective view illustrating a positional relation of main components at the time of switching driving.

The switching driving in the embodiment 1 is a driving performed in a state where the link body 4 is made to move from the rotor side to the front side by an attractive magnetic force of the switching operation means 6 and the insert shaft 46 of the gear plate 44 is disengaged from the bearing hole 53 of the cam 51. According to this, the active gear 45 and the passive gear 54 are meshed with each other (see FIGS. 6B and 7B), the rotational force of the shaft 32 is transmitted to the output shaft 52 via a rotational force transmitting engagement by a gear. The displacement amount of the rotational angle is transmitted to the output shaft 52 according to a rotational force transmission ratio. The rotational force transmission ratio is determined according to the length of each of a rotational radius of the active gear 45 from the shaft 32 and a rotational radius of the passive gear 45 from the output shaft 52. In the embodiment 1, when the shaft 32 axis-rotates within a range of 30°, an axial rotational force of 120° is output from the output shaft 52. In addition, in the embodiment 1, the movement regulation of the cam 51 that is rotating is performed by bringing the cam into contact with an inner wall of the rear cover 7.

In addition, the rotational direction of the cam 51 in the switching driving may be realized by an actuator having a CW (clockwise) mode or a CCW (counter clockwise) mode set at the time of assembly. This may be performed by changing the fitting position of the stopper pin 55 into the fitting hole 56. Specifically, when the stopper pin 55 is fitted into the fitting hole 56a positioned at a left side of a front plane in the figure, the meshing with the active gear 45 is made to move from the left end to the right end and thereby the cam 51 rotates in the clockwise direction. On the other hand, when the stopper pin 55 is fitted into the right-side fitting hole 56b, the meshing with the active gear 45 is made to move from the right end to the left end and thereby the cam 51 rotates in the counter clockwise direction.

OTHER EMBODIMENTS

In the embodiment 1, the rotational force transmission means between the link body 4 and the output element 5 is realized by the meshing of the active gear 45 and the passive gear 54, but it is not limited to this configuration. For example, even this is not shown, a configuration by pulleys and a belt may be possible, in which a pulley is attached on the periphery of the outer ring shaft 41 of the link body 4 and a pulley corresponding to the output shaft 52 is attached to the output shaft 52. In this case, it is necessary to block off the transmission of the rotational force by a configuration in which the pulleys of the link body are made to slide. In addition, the pulleys may be made as gears to connect to each other by a gear belt.

In addition, a configuration in which two kinds of link bodies are assembled may be possible as described below. Furthermore, a magnet disposed at the distal end of the gear plate 44 may magnetically attract the periphery of the output shaft to transmit a rotational force.

[Output Configuration of Two or More Modes]

In the embodiment 1, the two modes configuration of the sequential driving and the switching driving is described, but the technical idea of the invention is not limited thereto.

For example, configuration examples, in which three kinds of bi-directional rotational angle displacements are output, may include a configuration shown in side views and a perspective view of FIGS. 8A to 8D. This is made by further developing the above-described configuration of the output element 5, and a second cam 57 is disposed in a side opposite to the cam 51 (front side) with the passive gear 54 mounted to the main shaft 52 being interposed therebetween. The second cam 57 also has a second fitting hole 58 in a long hole shape similarly to the cam 51, and a second insert shaft 48, which fits into the second fitting hole, is formed to protrude at a front side of the gear plate 44. Since the insert shaft 46 and the second insert shaft 48 are formed to have a different rotational radius distance from the shaft 32, respectively, the link ratio between the gear plate 44 and the cam 51 is different in an engagement between the insert shaft 46 and the fitting hole 56 or an engagement between the second insert shaft 48 and the second fitting hole 58, respectively.

Due to the above-described configuration, the gear plate 44 is sequentially made to move in three states by the switching operation means 6, such that three kinds of engagement of (1) an engagement between the insert shaft 56 and fitting hole 56 (state of FIG. 8B), (2) an engagement between the active gear 45 and the passive gear 54 (state of FIG. 8C) and (3) an engagement between the second insert shaft 48 and the second fitting hole 58 (state of FIG. 8D) can be selectively performed and thereby it is possible to output three kinds of bi-directional and rotational angle displacements.

Hereinbefore, since the bi-directional rotary actuator according to the invention has high reliability and low power consumption despite having a compact size, it can be applied to a driving source of a guide piece for selecting a bank note path in an ATM (Automatic Teller Machine) or a driving source of a guide piece for sorting a paper in a printer or copying machine, or the like.

Embodiment 2

Hereinafter, embodiment 2 will be described.

FIGS. 9 to 17 show views for illustrating the embodiment 2 of the present invention. In reference numerals, a three-digit number starting from 1 is used, but when the last two-digits are the same as the embodiment 1, it refers to substantially the same components as those of the embodiment 1. In addition, the figures are drawn vertically reversely to that of embodiment 1 for clarifying the connection of each component.

In the description as described below, embodiment 2 is made by changing the configuration of each of the link body, the output element, and the switching operation means of the embodiment 1 while maintaining the basic components under the idea of the present invention. Therefore, description of components having substantially the same objective function as that of embodiment 1 will be omitted or simplified to avoid redundant description.

First, the embodiment 2 is accommodated in a casing including a rear cover 107 and a front plate 108 similarly to the embodiment 1.

Hereinafter, basic configurations will be separately described.

[Configuration of Rotary Solenoid]

Similar to the embodiment 1, a driving source is a rotary solenoid 101 that includes an electromagnetic coil 102 and a rotor 103 and is fixed to an inner bottom surface of the rear cover 107. The rotor 103 includes a shaft 132 serving as a rotational supporting shaft, a hub 131 fixed to the shaft 132 in an annularly mounted state (annularly mounted state on the outer circumferential surface), a fan-shaped amateur plate 134 attached to the hub 131 in a direction orthogonal to the shaft 132. The hub 131 has an engagement key 137 extending toward an output side (front side) in parallel with the shaft 132 in a side opposite to the amateur plate 134 (in figure, lower side). The bi-directional and rotational movement of the rotor 103 is transmitted via the engagement key 137. This is different from the rotational force transmitting means (engagement of the engagement pin 33 on the shaft 32) of the embodiment 1.

In addition, similarly to the embodiment 1, the shaft 132 is rotatably installed between a rear bearing 171 of the rear cover 107 and a bearing 181 of the front plate 108. In addition, the amateur plate 134 has two magnets 135, 135 formed to face the electromagnetic coil 102 and a back yoke 136 formed in a rear surface side (front side) thereof.

[Configuration of Link Body]

A link body 104 is connected and attached to the shaft 132.

The link body 104 has substantially the same configuration as that of the link body 4 of the embodiment 1, and includes an outer ring shaft 141 having an annular mounting opening 142 into which the shaft 132 rotatably penetrates, a gear plate 144 formed to extend from the outer ring shaft 141 in a direction orthogonal to an axis of the shaft 132, an active gear 145 formed at the periphery of the distal end of the gear plate 141 and an insert shaft 146 formed at a rear-side (rear cover side) side surface of the gear plate 144.

The insert shaft 146 becomes an engagement point (pin engagement) when the gear plate 144 and a cam 151 described below are link-connected. In the embodiment 2, a position of the insert shaft 146 in the gear plate 144 is set such that a link ratio becomes 2:3. Specifically, the setting of the link ratio to 2:3 means that a ratio (Lm:Ln) of a distance Lm from a rotational center Cg of the inset shaft 146 to a rotational center Cr of the shaft 132 of the rotor 103, which penetrates through the outer ring shaft 141, with respect to a distance Ln from a rotational center Cg of the insert shaft 146 to a rotational center Ca of an output shaft 152 of an output element 105 becomes 2:3.

In the link body 104, configurations different from the link body 4 of the embodiment 1, are an engagement groove 143 with which the rotor 103 side engagement key 137 engages, and an erected piece-shaped passive piece 141p that is formed in a shape of two wings extend from the outer ring shaft 141 in a radial direction. The engagement groove 143 protrudes from a circumferential side surface (in figures) of the outer ring shaft 141 to a lower side and both ends thereof in an axial direction A are opened to form a long groove shape, differently from the configuration (U-shaped cut-out groove) of the embodiment 1. The engagement key 137 is inserted from one end of the engagement groove 143 and engages with the engagement groove 143, such that the rotational force of the link body 104 is transmitted while the movement of the link 104 in the axial direction A being permitted.

In addition, the passive piece 141p is engaged with an arm 163 described below and receives an operation force from the arm 163. The shape of the passive piece is designed in a shape that is engaged with an operation piece 163p of the arm 163 to receive an operation force in the axial direction. In the illustrated embodiment 2, the operation piece 163p of the arm 163 is formed to interpose the erected piece-shaped passive piece 141p in the axial direction.

In the link body 104 configured as described above, the annular mounting opening 142 is annularly mounted on the shaft 132 of the rotor 103 to be rotatably supported. In the embodiment 2, a coil spring 149 as biasing means having an expansive force is attached between the link body 104 and the bearing 181 of the front plate 108. In addition, even though the coil spring 149 is not requisite, it is a preferable configuration to promote operational stability.

[Configuration of Output Element]

The output element 105 is displaced to be connected to the link body 104, and the connection configuration is a main object of the present invention.

The output element 105 includes a cam 151 formed in a rotor-side end of the output shaft 152 to extend in a direction orthogonal to an axis thereof, similarly to the embodiment 1. In addition, the cam 151 has, at a distal end thereof, a long-hole-shaped or round-hole-shaped bearing hole 53 engaged with the insert shaft 146 of the gear plate 144 with a little clearance (play).

In addition, the cam 151 has two cam 151a and 151b formed in the same rotational plane to extend in two directions with an interposed angle (or rotational angle) of 120° in a radial direction. The cams 151a and 151b have a bearing 153 in the distal ends thereof, respectively. One of the bearing holes 153 has a long hole shape and the other has a round hole shape. In addition, a band-plate-shaped and arc-shaped rib 151r is integrally formed between the cams 151a and 151b to a position facing a movement trajectory of the insert shaft 146 of the gear plate 144.

In the embodiment 2, the bearing holes 153 of the cam 151 and 151b are formed in a long hole shape and in a round hole shape, respectively, but both of them may be formed in a long hole shape.

In addition, a passive gear 154, which has a spaced distance Ld equal to or larger than a protrusion height Lh of the insert shaft 146 from the cam 151 toward a front side (Lh<Ld) and is disposed in parallel with the cam 151, is formed in the output shaft 152. The output shaft 152 of which a distal end is rotatably supported by an output bearing 182 provided in the front plate 108 functions as an external output.

[Configuration of Switching Operation Means]

Similarly to the embodiment 1, the switching operation means 106 is a mechanism to cause the link body 104 to move linearly, and is disposed between the front plate 108 and the link body 104. The characteristic of the embodiment 2 different from the embodiment 1 is that the switching operation from sequential driving to switching driving is performed via the arm 163. The arm 163 is formed to have a curved shape so as not to interfere with a fluctuation movement of the link body 104. An upper end 163t of the arm is vertically supported by a supporting bracket 164 attached on an upper surface (in figures) of the front plate 108, and a lower end thereof is supported to slide (back and forth bi-directional movement) in an axial direction A.

In addition, the arm 163 has, in a lower end (in figures) thereof, an operation piece 163p that engages with the passive piece 141p formed in the outer ring shaft 141 of the link body 104. As described above, the operation piece 163p has a shape to interpose the passive piece 141p for obtaining an operation force in an axial direction A of the output shaft 152 (in a bi-directional direction). In addition, in the embodiment 2, the passive piece 141p is formed in an erected piece shape, and the operation piece 163p is formed in a concave shape, but they may be formed contrary to this.

In addition, the arm 163 has a magnet 163m mounted on a substantially middle thereof in an embedded state. A magnetic pole of the magnet 163m faces an electromagnetic coil 161 attached to a rear side of the plate 108. Therefore, a repulsive force or an attractive force by a magnetic force is generated by the switching of a power distribution direction to the electromagnetic coil 161, and the arm 163 can be made to move in an axial direction A in a timely manner.

In addition, the operation piece 163p of the arm 163 has a protrusion 163n having a protruding amount capable of being exposed from the rear cover 107. The protrusion 163n is provided for a manual operation from an external side, for a return at the time of breakdown, for example. In addition, the operation means is not requisite, and it is not limited to the configuration of illustrated protrusion shape. Another mechanism may be selected for the same purpose. For example, various known mechanisms such as an operation by a magnet, an operation by a button or seesaw mechanism, and a mechanism operating a concave portion by using an operation rod, may be suitably selected.

[Explanation of Operation of Embodiment 2]

Figure 16:
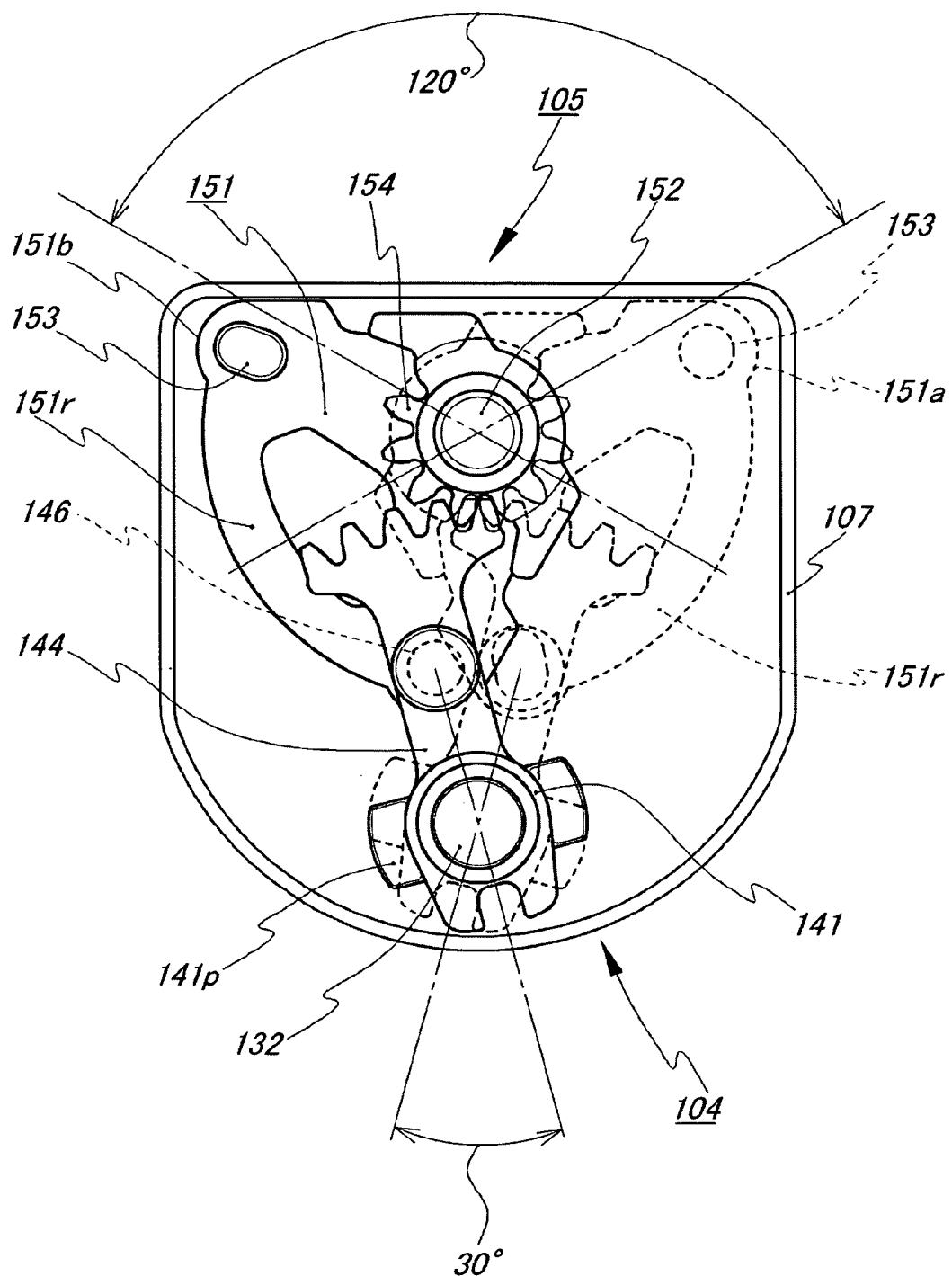
FIG. 16 a plan view illustrating each rotational state of an operational process of the embodiment 2.
Figure 17:
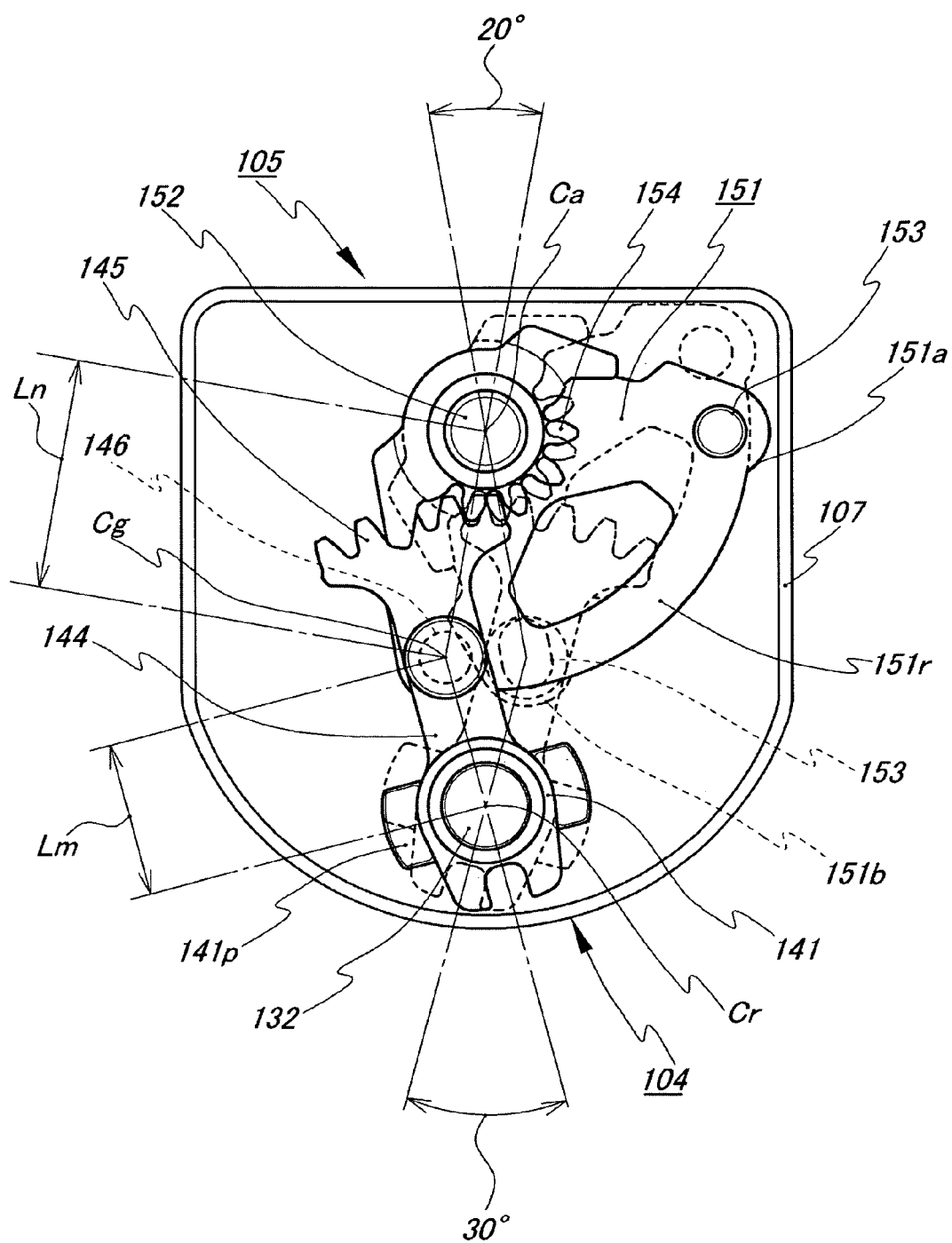
FIG. 17 is a plan view illustrating each rotational state of an operational process of the embodiment 2.

Hereinafter, an operation of the embodiment 2 configured as described above will be described with reference to accompanying drawings. FIGS. 16 and 17 show a plan view illustrating each rotational state of an operation process of the embodiment 2.

Similarly to the embodiment 1, the embodiment 2 uses a bi-directional rotational force of a rotational angle of 30° as a driving source supplied from the shaft 132 of the rotary solenoid 1, makes a change to the rotational angle and supplies a driving force having two or three different kinds of rational angles to the outside.

The output shaft 152, which becomes a driving output end to the outside, outputs a driving rotation force of two modes of a sequential driving to perform a bi-directional rotation from home position (initial state) to rotation angle α (for example, 20°) and a switching driving to switch this and perform a bi-directional rotation from a home position to displacement angle β (for example, 120°). In addition, it is possible to output three modes for performing additional sequential driving (second sequential driving) through the switching at both ends of a rotational trajectory at the time of the switching driving. The three modes output is performed in a manner that it is switched from the sequential driving at a home position (in figure, a state depicted by a dotted line) to rotate, is switched at a position of the rotational trajectory end (in figure, a state depicted by a solid line), and at the position, performs a sequential driving (bi-directional rotation from a home position to a range of 100° to 120°).

In addition, in FIGS. 16 and 17, only the bearing hole 153 of the cam 151*b* is made to have a long hole shape and the bearing hole 153 of the other cam 151*a* is made to have a round hole shape at the time of home position, such that in this case, it operates only as a locking mechanism.

In the description below, a portion of basic two modes switching operation process similar to the embodiment 1 is omitted to avoid redundant description, and a characteristic operation of the embodiment 2 will be described.

[Characteristics of Operation of Embodiment 2 and Effect Thereof]

The operation of the embodiment 2 and the embodiment 1 have the characteristics described below.

(1) Operation of the Link Body Including the Gear Plate as a Main Part

In the embodiment 1, the switching operation is performed by direct acting on the magnet 47 of the gear plate 44 by an excitation of the electromagnetic coil 61. Contrary to this, in the embodiment 2, the arm 163 is operated by acting the electromagnetic coil 161 on the magnet 163*m* of the arm 163 and then the link body 104 is made to move. The outer ring shaft 141 of the gear plate 144 is made to reciprocate along the shaft 132 by using the arm 163 as a kind of lever, such that the operation may be reliably performed with a low electromagnetic force.

Therefore, the engaged link body 104 slides in a bi-directional manner in a direction of the shaft, and thereby the insert shaft 146, which is formed at a surface facing the rotor, is made to enter into and exit from the inside of the bearing 153 formed at a distal end of the cam 151.

Under this configuration, an attractive force from the electromagnetic coil 161 acts on the magnet 163*m* and thereby the arm 163 is attracted, the gear plate 144 is made to move to the front side, the insert shaft 146 is deviated from the bearing hole 153, and at the same time, the active gear 145 meshes with the passive gear 154, such that a rotational force is transmitted from the gear plate 144 to the output element 105 through the gear meshing. Therefore, as shown in FIG. 16, the cam 151 can perform a bi-directional rotation at a rotational angle of 120°.

On the other hand, when the power distribution direction to the electromagnetic coil 161 is switched to apply a repulsive force to the electromagnetic coil 161 and thereby the arm 163 is pressed toward a rear side, the gear plate 144 is made to move toward a rear side, the insert shaft 146 inserts into the bearing 153 of the cam 151 and link-connects thereto, and at the same time the active gear 145 is detached from the active gear 154 to release the meshing and thereby the transmission of a rotational force by the link-connection from the gear plate 144 to the output element 105 according to a link ratio is performed. Therefore, as shown in FIG. 17, the cam 151 performs a bi-directional rotation at a rotational angle of 20°.

Here, since the magnet 163*m* attached to the arm 163 is disposed to be departed from the shaft 132 and the electromagnetic force (repulsive force or attractive force) from the electromagnetic coil 161 is made to act, the distal end side of the gear plate 144 enters an inclined state at the time of operating. This occurs by a clearance (gap amount) between an inner circumference surface of the outer ring shaft 141 and an outer circumference surface of the shaft 132 that are attachment portions of the gear plate 144. The occurrence of the inclination is effective for facilitating the meshing of the active gear 145 and the passive gear 154.

In addition, in the embodiment 2, the coil spring 149 is mounted between the outer ring shaft 141 and the front plate 108 for promoting the operational stability of the link body 104. However, this is not essential and even though the coil spring is not provided, as is the case with the embodiment 1, an attractive force (in the same direction as that of the biasing force of the coil spring 149) acts on the magnet 163*m* of the arm 163 due to a rotor-side magnetic operation, and thereby the operational stability of the similar link body 104 is promoted.

(2) Operation of a Rotation Locking Mechanism of the Output Shaft

Similarly to the embodiment 1, in the embodiment 2, in a state where the insert shaft 146 is detached from the bearing hole 153, the active gear 145 meshes with the passive gear 154, and the output shaft 152 can perform a bi-directional rotational movement (switching operation) within a specified range of 120°, similarly to the principle of operation of the embodiment 1.

In both end positions of the bi-directional rotational movement, two cams 151*a* and 151*b* disposed with an interposing angle (or rotational angle) of 120° in a radial direction are made to correspond to each other. Thus, when the electromagnetic coil 161 of the switching operation means 106 is activated at both end positions of the rotation, it is possible to insert the insert shaft 146 into the bearing 153 of the cam 151.

When the bearing hole 153 is formed in a round hole shape, the rotation of the cam 151 can be regulated, and thereby it is possible to allow the rotation of the output shaft 152 to be locked state. In addition, when the bearing 153 is formed in a long hole shape, it is possible to perform a bi-directional rotation (second sequential driving) of a rotational angle of 20° at this position.

Specifically, when one of the two bearing holes 153 of the cam 151 is made to have a long hole shape and the other is made to have a round hole shape, the configuration of the embodiment 2 becomes a mechanism having two kinds (two modes) of a bi-directional rotation and a locking mechanism. When both of the bearing holes 153 are made to have a long hole shape, it becomes a mechanism having a driving output of three kinds (three modes) of bi-directional rotations.

(3) Malfunction Preventing Mechanism of Switching Operation Means

In the embodiment 2, the arc-shaped band plate rib 151r is formed integrally with the two cams 151a and 151b formed in two directions with an interposing angle of 120° to connect them. Therefore, during a bi-directional rotation of 120° (in this case, the insert shaft 146 is in a state of being detached from the bearing hole 153), when the power distribution of the electromagnetic coil 161 is switched for some reason and thereby the switching operation means 106 is made to reversely operate to cause the insert shaft 146 to move a rear side (malfunction), the distal end of the insert shaft 146 comes into contact with the rib 151r and thereby it is possible to block the movement of the gear plate 144. Therefore, the meshing of the active gear 145 and the passive gear 154 is maintained and the bi-directional and rotational driving of 120° is made to be continued. That is, it is effective for avoiding the malfunction during the switching driving of 120°.

(4) Operation of Manual Switching Mechanism

In the embodiment 2, the protrusion 163n exposed from the rear cover 107 is formed adjacently to the operation piece 163p of the arm 163. Therefore, it is effective for manually moving the gear plate 144 by operating the protrusion 163n from the outside, by hand or using an operation rod, and thereby an operation shutdown condition caused by a power outage or an external device connected to the output shaft 152 can be returned by a manual operation.

What is claimed is:

1. A bi-directional rotary actuator, comprising:
   a rotary solenoid, supported by a base, that supplies a bi-directional rotational force of a predetermined rotational angle;
   a link body that engages with a shaft of the rotary solenoid to be allowed to move in an axial direction and that transmits a rotational force;
   an output element that selects one engagement assembly, including two or more kinds of different link ratios or rotational force transmission ratios, to receive a rotational force from the link body; and
   a switching operation assembly that performs the selection of the engagement assembly by a movement in an axial direction of the link body annularly mounted on the shaft.

2. The bi-directional rotary actuator according to claim 1, wherein the engagement assembly between the link body and the output element is either a link engagement or a rotational force transmitting engagement.

3. The bi-directional rotary actuator according to claim 1, wherein the link body includes:
   an outer ring shaft attached to the shaft to be allowed to move in an axial direction and to transmit the rotational force from the shaft;
   a gear plate formed to extend from the outer ring shaft in a direction orthogonal to the shaft;
   an active gear formed on a rotational circumference of the gear plate along a rotational direction; and
   an insert shaft formed on a side surface of the gear plate in a protruded shape, and
   wherein a formation position of the insert shaft in the gear plate is set such that a distance from a rotational center of the insert shaft to a rotational center of a shaft of a rotor and a distance from a rotational center of the insert shaft to a rotational center of an output shaft of the output element become a predetermined link ratio.

4. The bi-directional rotary actuator according to claim 1, wherein the output element includes:
   an output shaft;
   one or two or more cams, formed from the output shaft in a direction orthogonal to an axis thereof, that have, at a distal end thereof, a bearing hole with a shape allowing the insert shaft formed on the gear plate to be inserted thereto; and
   a passive gear, formed on the output shaft with a spaced distance from the cam which is equal to or larger than a length of the insert shaft, that has a tooth row meshed with the active gear.

5. The bi-directional rotary actuator according to claim 4, wherein the passive gear is movably and annularly mounted on the output shaft and has a stopper pin, and the stopper pin fits into fitting holes provided at two positions in a base of the cam in a rotational direction to regulate a rotation of the passive gear about the output shaft.

6. The bi-directional rotary actuator according to claim 1, wherein the switching operation assembly, which allows the link body to slide along the shaft, is realized by an electromagnetic force between a magnet disposed at a rear-surface side of a surface on which the insert shaft of the gear plate of the link body is formed and an electromagnetic coil disposed to face a magnetic pole of the magnet.

7. The bi-directional rotary actuator according to claim 1, wherein the switching operation assembly includes:
   an arm supported to move along a shaft and that applies an operation force to the link body;
   a magnet disposed on the arm; and
   an electromagnetic coil disposed to face a magnetic pole of the magnet.

8. The bi-directional rotary actuator according to claim 4, wherein, in formation positions of the two or more cams,
   two cams are formed on a surface, which is orthogonal to an axis of the output shaft, with an interposing angle of a predetermined rotational angle, and
   a bearing hole is formed in a distal end of each of the cams in the same rotational radius.

9. The bi-directional rotary actuator according to claim 8, wherein, in the formation of the plural cams, an arc-shaped rib is formed to connect the cams at a position corresponding to a movement trajectory of each of the bearing holes.

10. A bi-directional rotary actuator, comprising:
    a rotary solenoid, supported by a base, that supplies a bi-directional and rotational force of a predetermined rotational angle;
    a link body that engages with a shaft of the rotary solenoid to be allowed to move in an axial direction and to transmit a rotational force;
    an output element that selects one engagement assembly, from two or more kinds of engagement assemblies including an engagement point of a different rotational radius, to receive a rotational force from an outer ring shaft of the link body; and
    a switching operation assembly that performs a selective engagement between the output element and the link body, by moving the link body connected to the shaft.

11. The bi-directional rotary actuator according to claim 10, wherein the engagement assembly between the link body and the output element is either a link engagement or a rotational force transmitting engagement.

12. The bi-directional rotary actuator according to claim 10, wherein the link body includes:
- an outer ring shaft attached to the shaft to be allowed to move in an axial direction and to transmit the rotational force from the shaft;
- a gear plate formed to extend from the outer ring shaft in a direction orthogonal to the shaft;
- an active gear formed on a rotational circumference of the gear plate along a rotational direction; and
- an insert shaft formed on a side surface of the gear plate in a protruded shape, and
- wherein a formation position of the insert shaft in the gear plate is set such that a distance from a rotational center of the insert shaft to a rotational center of a shaft of a rotor and a distance from a rotational center of the insert shaft to a rotational center of an output shaft of the output element become a predetermined link ratio.

13. The bi-directional rotary actuator according to claim 10, wherein the output element includes:
- an output shaft;
- one or two or more cams, formed from the output shaft in a direction orthogonal to an axis thereof, that have, at a distal end thereof, a bearing hole with a shape allowing the insert shaft formed on the gear plate to be inserted thereto; and
- a passive gear, formed on the output shaft with a spaced distance from the cam which is equal to or larger than a length of the insert shaft, that has a tooth row meshed with the active gear.

14. The bi-directional rotary actuator according to claim 13, wherein the passive gear is movably and annularly mounted on the output shaft and has a stopper pin, and the stopper pin fits into fitting holes provided at two positions in a base of the cam in a rotational direction to regulate a rotation of the passive gear about the output shaft.

15. The bi-directional rotary actuator according to claim 10, wherein the switching operation assembly, which allows the link body to slide along the shaft, is realized by an electromagnetic force between a magnet disposed at a rear-surface side of a surface on which the insert shaft of the gear plate of the link body is formed and an electromagnetic coil disposed to face a magnetic pole of the magnet.

16. The bi-directional rotary actuator according to claim 10, wherein the switching operation assembly includes:
- an arm supported to move along a shaft and applies an operation force to the link body;
- a magnet disposed on the arm; and
- an electromagnetic coil disposed to face a magnetic pole of the magnet.

17. The bi-directional rotary actuator according to claim 16, wherein the arm is supported to slide along an axis of a shaft, and includes an operation piece that is formed in a distal-end sliding portion of the arm to engage with the outer ring shaft of the link body and a magnet disposed in a middle portion of the arm.

18. The bi-directional rotary actuator according to claim 13, wherein, in formation positions of the two or more cams,
- two cams are formed on a surface, which is orthogonal to an axis of the output shaft, with an interposing angle of a predetermined rotational angle, and
- a bearing hole is formed in a distal end of each of the cams in the same rotational radius.

19. The bi-directional rotary actuator according to claim 18, wherein, in the formation of the bearing hole formed in a distal end of each of the two cams, one of the bearing holes is formed to have a long hole shape and the other is formed to have either a long hole shape or a round hole shape.

20. The bi-directional rotary actuator according to claim 18, wherein, in the formation of the plural cams, an arc-shaped rib that is formed to connect the cams at a position corresponding to a movement trajectory of each of the bearing holes.

* * * * *